E. L. HOPKINS.
MINING APPARATUS.
APPLICATION FILED OCT. 11, 1912. RENEWED JULY 30, 1920.

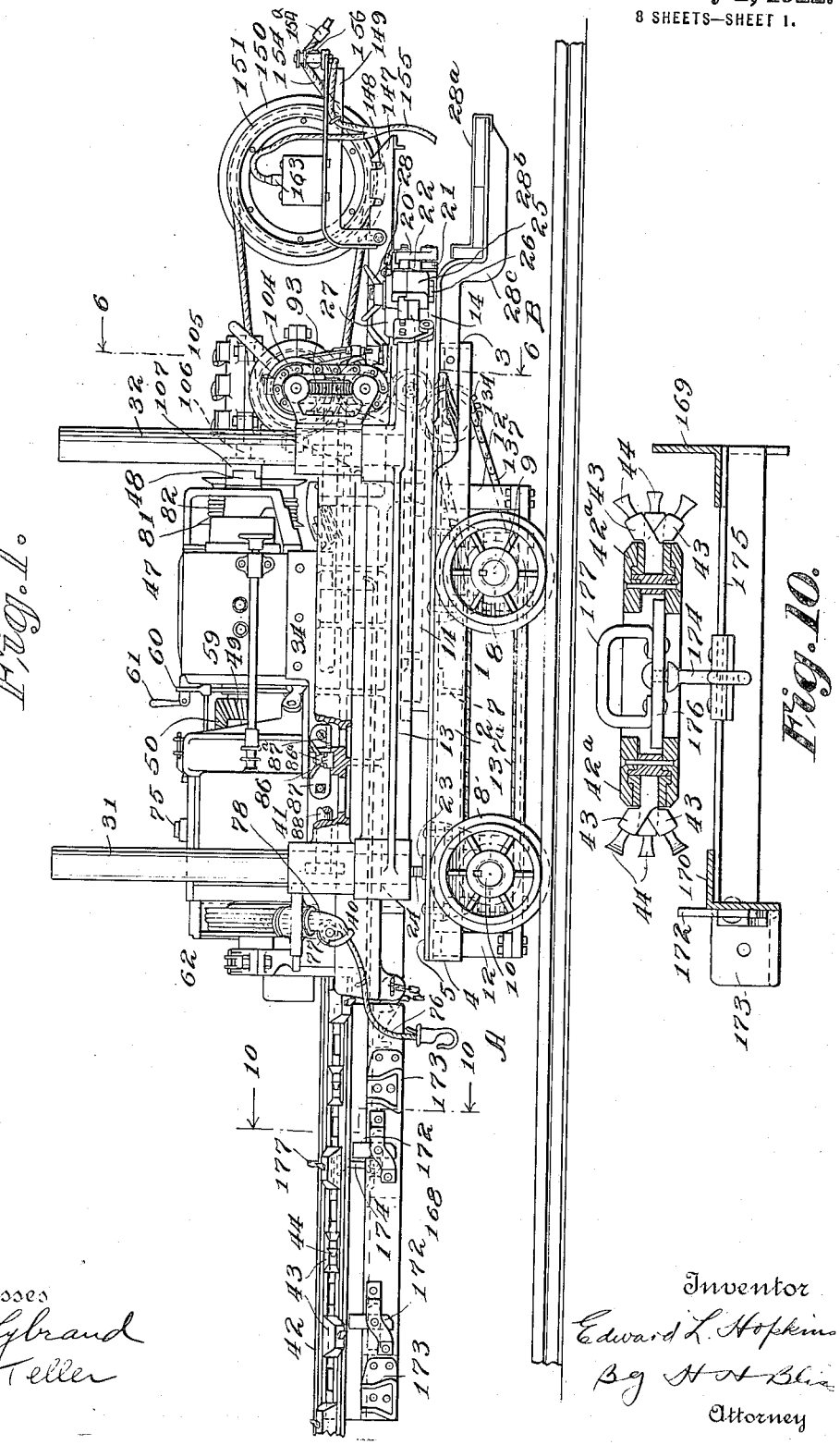

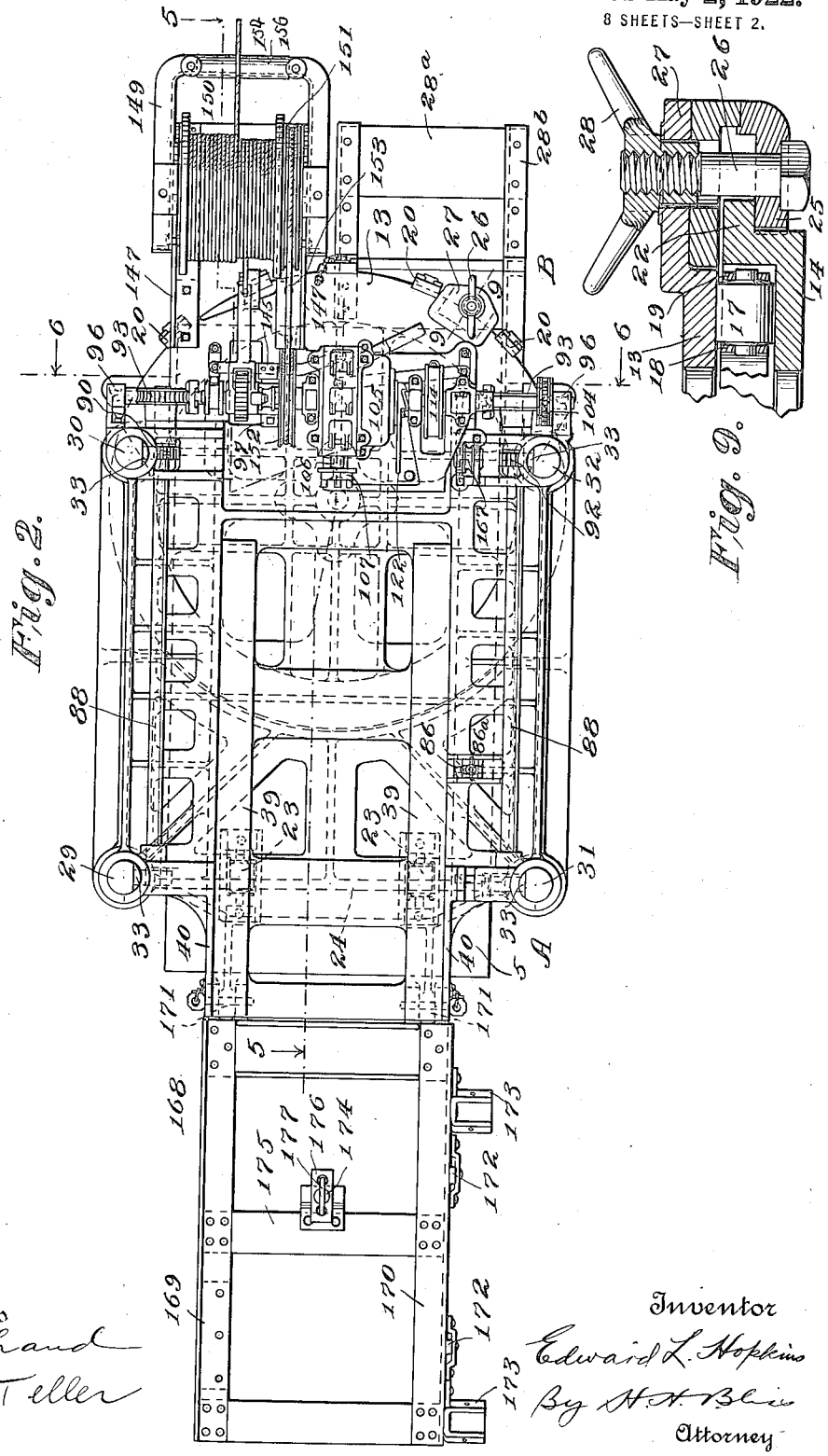

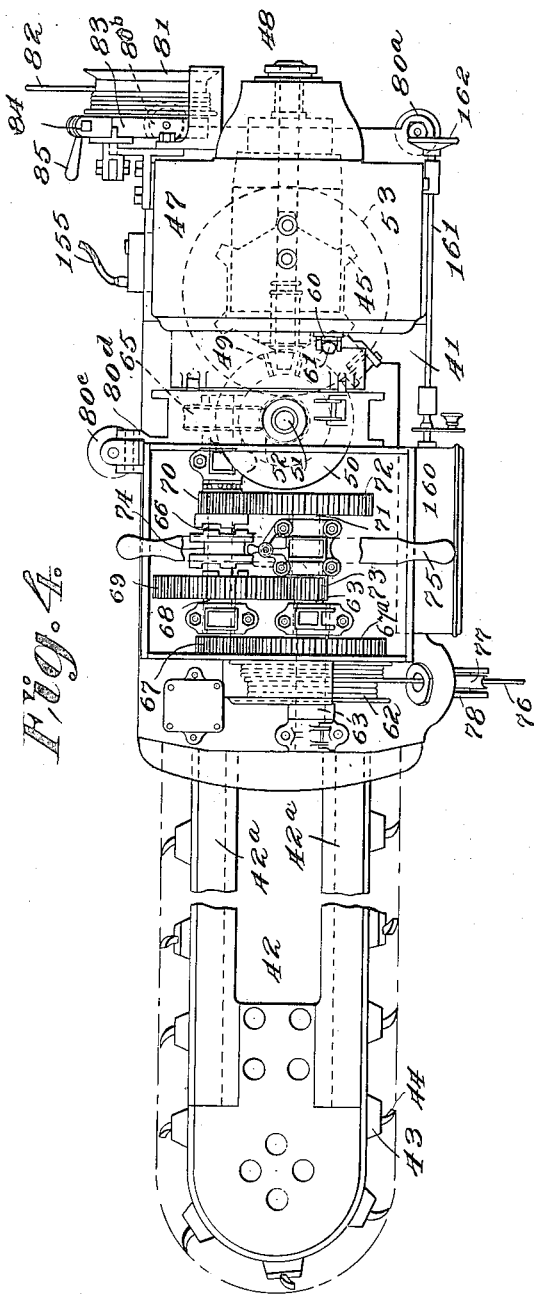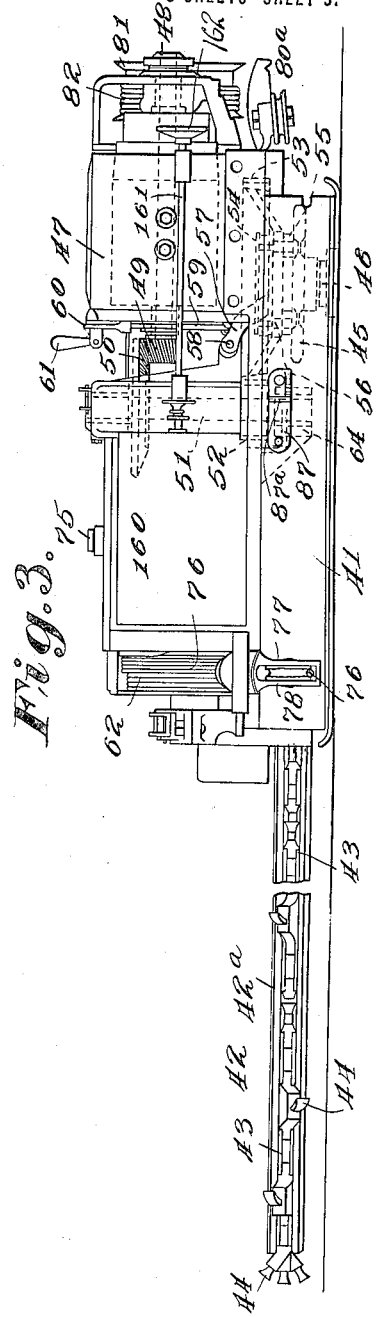

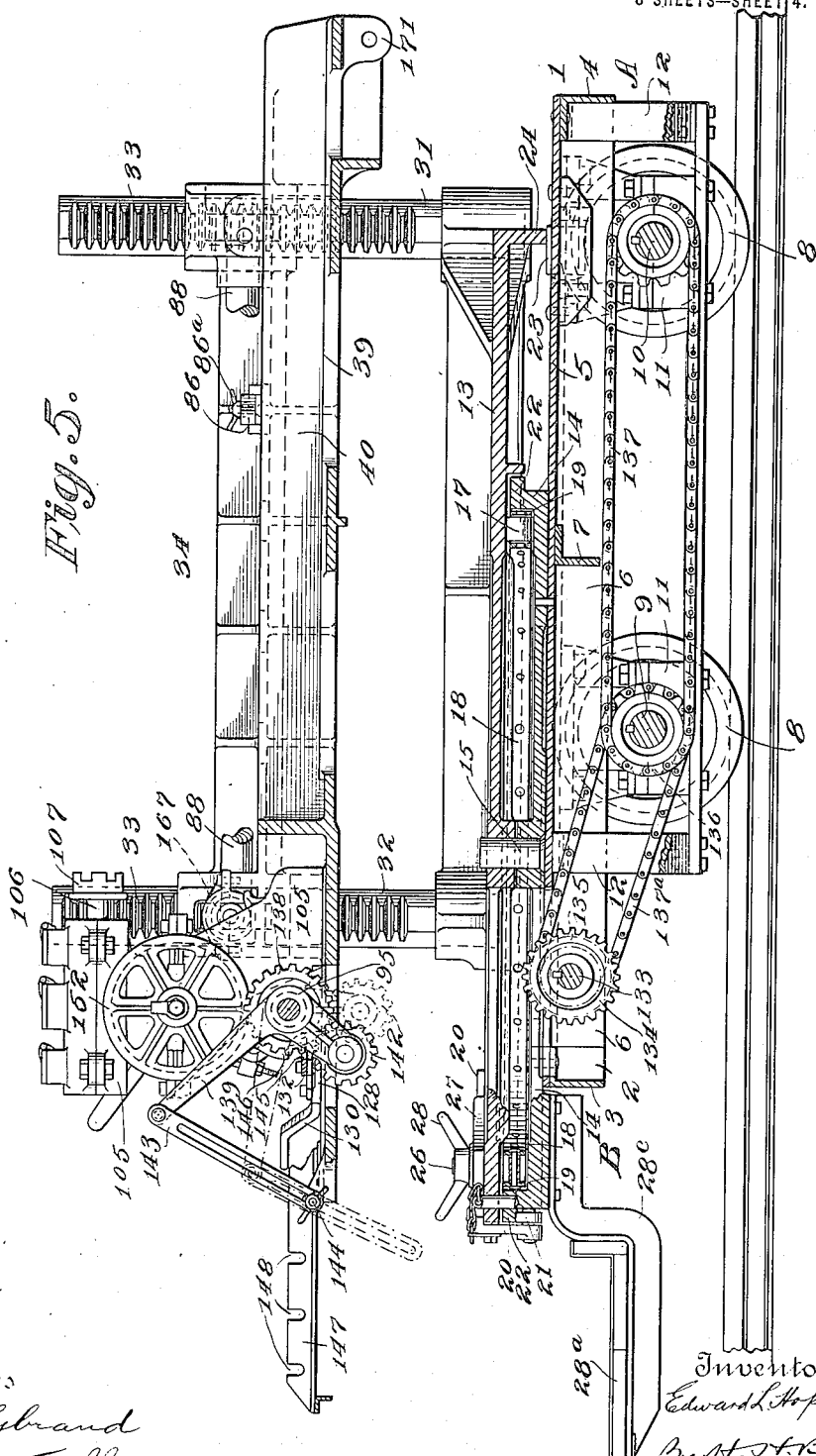

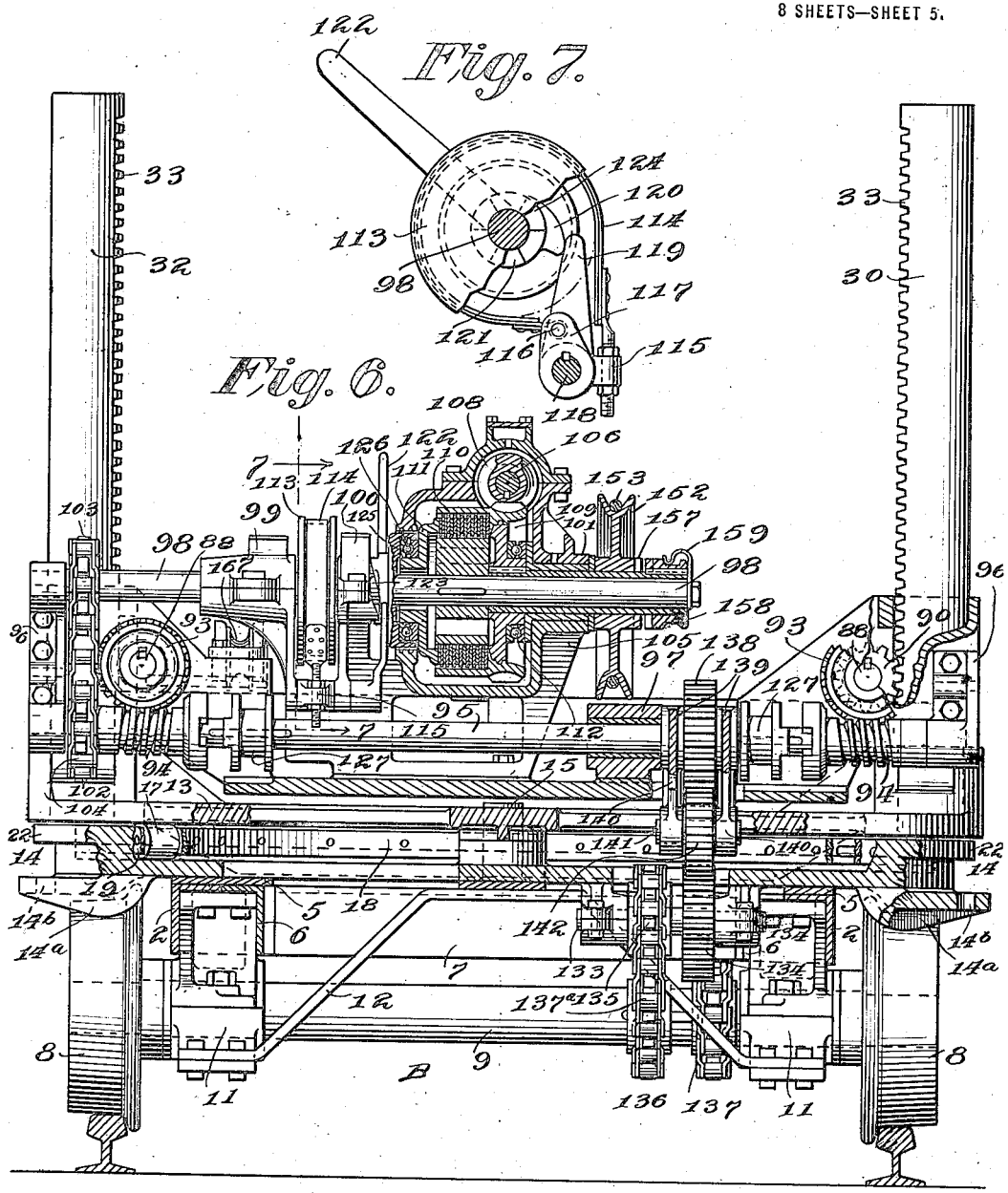

1,414,877. Patented May 2, 1922.
8 SHEETS—SHEET 6.

Witnesses
H. N. Lybrand
S. Jay Feller

Inventor
Edward L. Hopkins
By H. A. Bliss Attorney

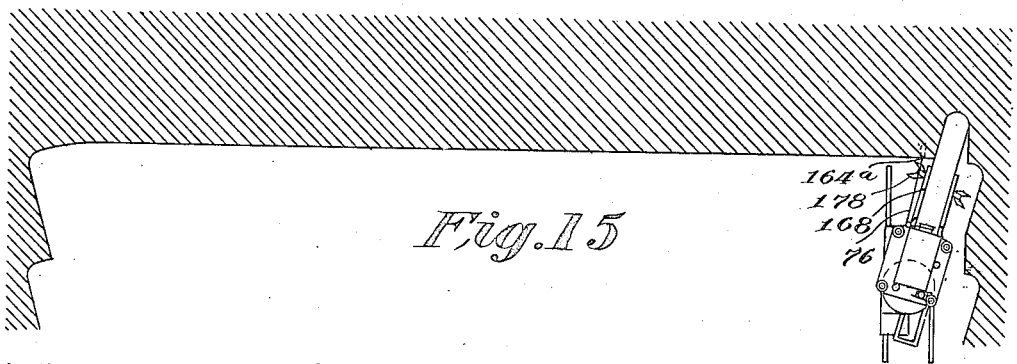
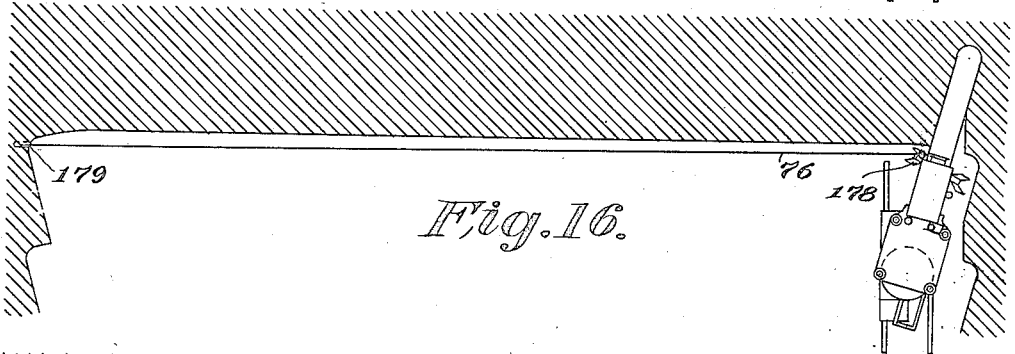
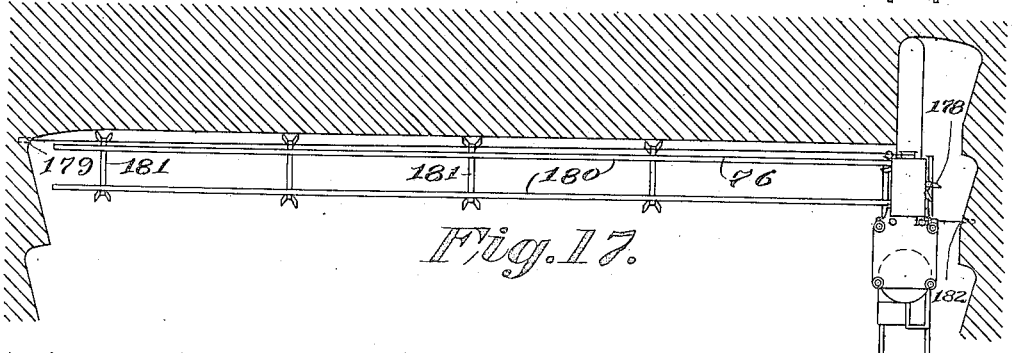
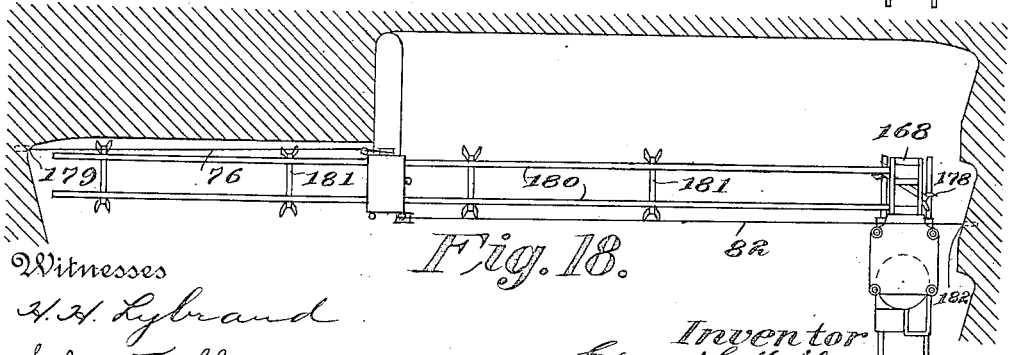

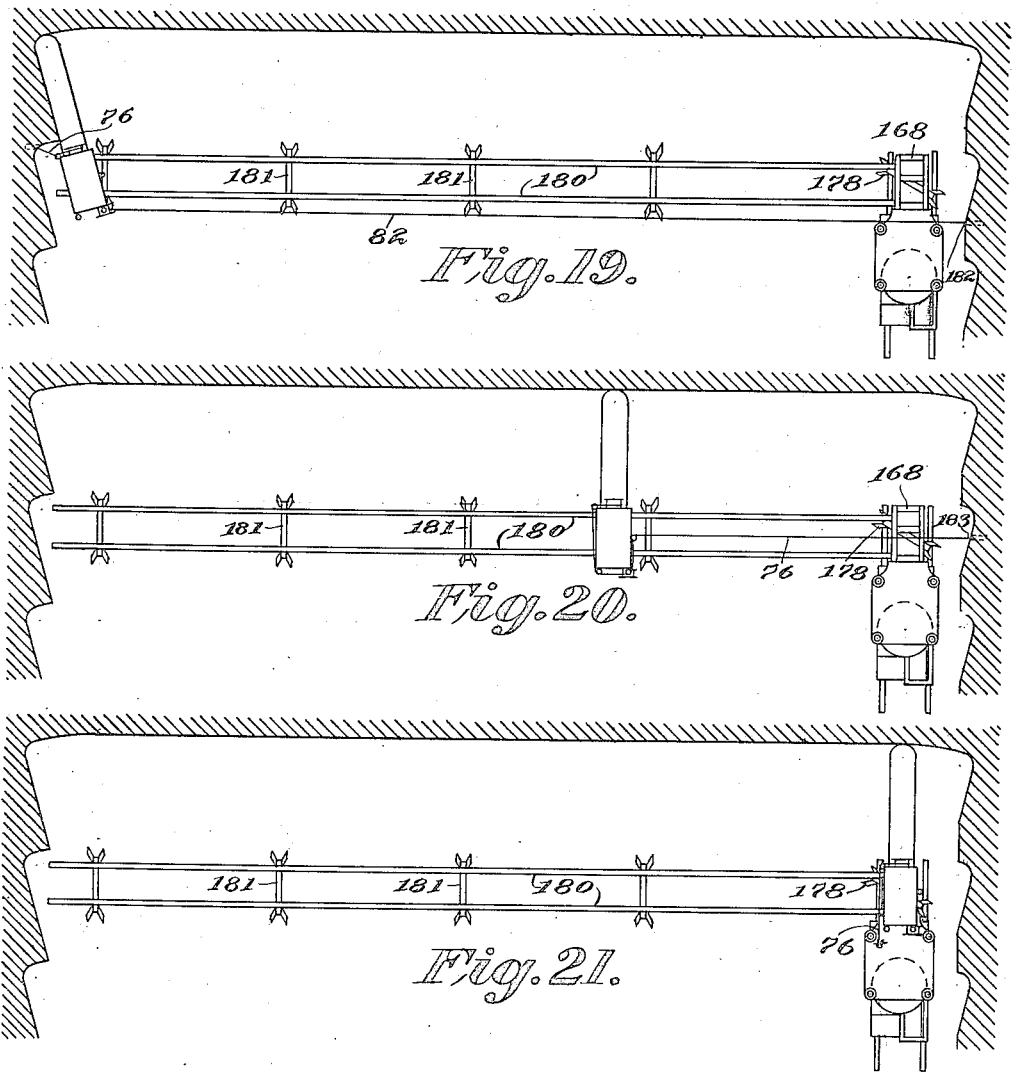

UNITED STATES PATENT OFFICE.

EDWARD L. HOPKINS, OF COLUMBUS, OHIO, ASSIGNOR TO THE JEFFREY MANUFAC-
TURING COMPANY, OF COLUMBUS, OHIO, A CORPORATION OF OHIO.

MINING APPARATUS.

1,414,877. Specification of Letters Patent. Patented May 2, 1922.

Application filed October 11, 1912, Serial No. 725,276. Renewed July 30, 1920. Serial No. 400,213.

*To all whom it may concern:*

Be it known that I, EDWARD L. HOPKINS, a citizen of the United States, residing at Columbus, in the county of Franklin and State of Ohio, have invented a certain new and useful Improvement in Mining Apparatus, of which the following is a specification, reference being had therein to the accompanying drawings.

The invention relates to mining apparatuses of the class in which each is supported on a movable base (preferably a wheeled truck) and carries a horizontally projecting kerf cutting mechanism which is capable of movement horizontally relatively to the base or truck and is adapted to operate while supported on the said base or truck. One way of using a mining apparatus of this type is to lay a single track along the center of the room or entry being cut and to then move the mining mechanism or apparatus forward along this track to a point near the face. Use is then made of the cutting mechanism of the apparatus to cut a kerf extending across the face from one side to the other, the said cutting mechanism remaining supported on the truck while the cutting is being carried on.

By my invention I have provided an apparatus in which the cutting mechanism is movable not only transversely across the front of the machine (preferably angularly about a fixed vertical axis), but also translatively outward and inward away from and toward the central parts of the truck; and I have provided power operated means for moving the cutting mechanism horizontally relatively to the truck outward and inward and transversely so that it will be fed to its work. The connection between the cutter mechanism and the truck is such that the mechanism is held in a definite angular relation to the truck for each position of transverse adjustment. With this construction it is possible for the cutting mechanism to be moved outward so that the cutters across its front can be brought into operation and for the cutting mechanism to be moved transversely so that the cutting devices along its side can be brought into operation.

I have shown an apparatus which comprises a mining machine of the "shortwall" type supported on a frame which is adjustable with respect to the truck frame angularly and vertically; but it will be understood that there can be wide variation as concerns the specific form of cutting mechanism used and as concerns the means for supporting, driving and controlling it. I have shown the mining machine as removable from the truck so as to be capable of operation at points separated therefrom; but it will be understood that the invention, in its broader aspects, is not limited to an apparatus comprising a removable or separable complete mining machine.

As is well known, it is customary in the mining of coal to cut a kerf under the wall to be removed and then to break down the material above the kerf. But under some conditions it is possible and in fact preferable to cut the kerf not at the bottom but at a plane above the bottom. An apparatus embodying my invention is adapted for use under those conditions which make possible the cutting of an elevated kerf. The desirability of a kerf some distance above the mine floor frequently arises from the presence in the coal of what is known as a "dirty band," this usually being composed of slate or other refuse material which it is undesirable to permit to become mixed with the coal. In places where such a "dirty band" is met with, it is desirable to cut it away. This cutting away of the "dirty band" not only removes it and prevents its becoming mixed with the coal, but also provides the necessary kerf. As the "dirty band" is at different heights in different mines, or even in different parts of the same mine, it is desirable that any apparatus designed for cutting it out be provided with means for effecting vertical adjustment. It will be understood that while the mounting of the cutting apparatus at a relatively high elevation is preferable for some classes of work, the invention is not limited in this respect.

An apparatus embodying my invention is especially adapted for the class of work to which I have referred. It can be readily adjusted vertically, it can be easily transported from place to place, and is adapted to be used and handled in novel ways which will be hereinafter fully described. By preference it comprises as aforesaid two main mechanisms, one a cutter mechanism which may be a mining machine of the sort now well-known for the continuous cutting of kerfs in rooms, and the other a truck or transporting and holding mechanism for the machine.

One of the principal objects of the invention is to provide a mining apparatus of the type specified having a cutting mechanism which is movable horizontally both angularly and translatively and having power mechanism for effecting movement in both of the said ways.

Another object of the invention is to provide in a mining apparatus, the combination of a mechanism for supporting a mining machine at an elevation while a "sumping" cut is being made, and means for then supporting it at an elevation during the cutting of a kerf across a room.

A further object of the invention is to provide in an apparatus of this kind improved means for supporting the cutting mechanism in such a way that it can be adjusted vertically or moved angularly, and to provide power operated devices for operating the said adjusting means. Another object is to provide an improved device whereby the machine can be supported while being unloaded from the truck or loaded on to it. A still further object is to provide improved means whereby power can be transmitted from the mining machine motor to drive the wheels of the truck. Another object is to provide in an apparatus of this type an electric cable reel supported and driven by improved devices. Other objects are to provide certain improved details of construction and certain improved arrangements of parts, all of which are made clear in the accompanying drawings and in the following specification.

Of the drawings, which illustrate the preferred embodiment of my invention,—

Fig. 1 is a side view of the apparatus as a whole.

Fig. 2 is a plan view of the apparatus with the mining machine removed.

Fig. 3 is a side elevation of the mining machine separate from the other mechanism.

Fig. 4 is a plan view of the mining machine, the top part of the gear case being removed to expose the gearing.

Fig. 5 is a cross sectional view on a somewhat larger scale of the truck without the mining machine or the skid. The view is taken along the line 5—5 of Fig. 2.

Fig. 6 is a cross sectional view on a still larger scale of the truck with the mining machine removed. The view is taken along the lines 6—6 of Figs. 1 and 2.

Fig. 7 is a fragmentary sectional view taken along the line 7—7 of Fig. 6, some of the parts being broken away in order that others may be clearly shown.

Fig. 9 is a fragmentary detail view taken along the line 9—9 of Fig. 2.

Fig. 10 is a cross sectional view taken along the line 10—10 of Fig. 1.

Figs. 15, 16, 17, 18, 19, 20 and 21 are diagrammatic views showing another way in which the apparatus may be used.

Figure 8:
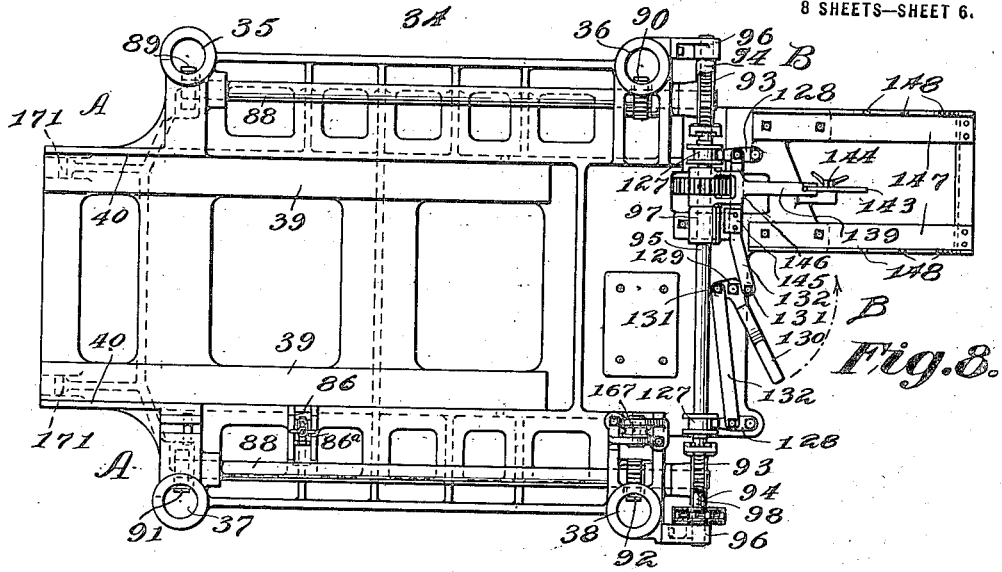
Fig. 8 is a plan view of the mining machine supporting frame separated from some of the other parts of the truck.

Referring to the drawings, 1 represents as a whole the main or base frame of the truck. This frame comprises side bars, 2, 2 and two end cross bars 3 and 4. These side and end bars are preferably angle irons arranged with their horizontal flanges uppermost and turned inward. Secured to the upper horizontal flanges of the angle irons is a rectangular plate 5 which forms the main platform of the truck. In addition to the side angle bars 2, 2, there are other longitudinal angle bars 6, 6 which are arranged with their horizontal flanges uppermost and turned outward. Extending transversely between the angle bars 6, 6 is a transverse angle bar 7 which is secured at its ends to the bars 6, 6 and which assists in supporting the plate 5. The frame 1 is supported by means of track wheels 8, 8 and axles 9 and 10 which are mounted in suitable bearings 11, 11. The brackets for the bearings 11, 11 extend upward between the angle bars 2 and 6 at each side of the frame and are there secured in place. Preferably the frame and the bearing brackets are reinforced laterally by means of brace bars 12. It will be noted that the axles 9 and 10 are not symmetrically disposed with respect to the transverse central plane of the truck frame but are considerably nearer the end A than the end B. The reason for this will be made apparent.

On the base frame of the truck is a plate-like movable frame 13 which, in co-operation with other parts which will presently be described, is designed to support a cutting mechanism so that said mechanism can be turned horizontally, moved rectilineally horizontally and adjusted vertically in relation to the base frame. In the particular construction shown, the frame 13 is mounted after the manner of a turn-table. 14 is a base ring or plate secured to the top plate 5 of the truck. The base plate 14 carries a pivot stud 15 which projects upward through a suitable bearing aperture in the movable frame 13. Interposed between the base plate 14 and the frame 13 are a series of rollers 17, 17 which are held in place and guided by means of concentric rings 18, 19.

Secured to the frame 13 at the rear end thereof are several depending clips 20 which carry at their lower ends rollers 21 mounted for rotation about horizontal axes and adapted to engage the under side of an outward projecting annular flange 22 on the base plate 14. These rollers serve to prevent the rear end of the frame from tilting upward when loaded at its forward end. As a further means for supporting the forward end of the frame 13 I provide on the truck frame horizontal rollers 23, 23 which are engaged by a flange 24 on the frame 13. It will be seen that by means of the several devices which I have described the frame 13 is very securely mounted on the truck frame but is at the same time free to be turned about a vertical axis extending through the stud 15.

In order that the movable frame 13 may be locked at any desired position with respect to the truck frame, I provide a brake shoe 25 adapted to frictionally engage the lower surface of the flange 22 (see Fig. 9). This brake shoe 25 is carried by a bolt 26 which extends upward through a suitable aperture in a projection 27 on the frame 13. At the upper end of the bolt 26 there is a hand nut 28 by means of which the bolt can be drawn upward to force the brake shoe against the flange 22. Obviously then the whole frame 13 is held against movement.

28$^a$ is a platform for the operator. This is preferably supported on two rearward extending brackets, one of which, 28$^b$, is secured directly to the main frame 1 of the truck, and the other of which, 28$^c$, is secured to the base plate 14 of the turntable.

Upon the base plate of the turntable there are formed two horizontally projecting lugs or brackets 14$^a$, 14$^a$, which are provided with apertures 14$^b$, 14$^b$. Under certain conditions of use jacks can be put in place with their lower ends in engagement with the lugs 14$^a$, 14$^a$ and with their upper ends in engagement with the mine roof. In this way the machine can be held securely in place on the truck. These lugs can also be used for the attachment of the ends of a haulage cable when the apparatus is to be moved by means of a locomotive.

Firmly secured at their lower ends in the frame 13 are four upright supports in the form of vertical studs 29, 30, 31 and 32 arranged to define a horizontal polygon, preferably a rectangle. Each of these studs is provided at the side toward the longitudinal central plane of the machine with rack teeth 33, the purpose of which will presently appear. Above the frame 13 is a cradle 34 to receive and support a cutting mechanism and, in the construction shown, the cradle is designed to receive an entire, self contained mining machine of the "shortwall" type. The cradle is provided with four apertures 35, 36, 37 and 38 which fit over the upright supports or studs 29, 30, 31 and 32. The engagement of the walls of the apertures with the studs serves to guide the cradle for vertical movement relative to the frame 13, relative horizontal movement being prevented. The cradle is provided with longitudinal skids 39, 39, and with vertical flanges 40, 40, adjacent the skids. These skids and flanges cooperate in supporting the mining machine in such a way that it can be either fixed against movement or can be slid longitudinally of the cradle.

The mining machine which I have shown in the drawings does not of itself constitute a part of my invention and it is therefore unnecessary to describe it in detail. However, a brief reference to some of its important parts will be helpful in reaching an understanding of the construction and operation of the mining machine supporting and controlling mechanism and an understanding of the co-operative relationship between the mining machine and the supporting and controlling mechanism. It may here be noted that the mining machine is in the main like that shown in the United States Letters Patent to E. R. Merrill, 1,127,663, to which reference may be had for a detailed showing and description.

The mining machine comprises a bed frame 41 adapted to slide upon the skids 39, 39 and to be guided by the flanges 40, 40. From the forward end of the bed frame there projects a cutter frame 42 which serves to support and guide an endless chain 43 carrying cutters 44, 44. The chain 43 passes over a sprocket wheel 45 which is rotatably mounted on a vertical stud shaft 46 secured to the bed frame. Mounted on the bed frame of the mining machine there is an electric motor 47 arranged with its armature shaft extending longitudinally of the mining machine. At the outer end, i. e., the end away from the cutting mechanism, the armature shaft of the motor is provided with a clutch element 48 which is useful in a way to be described. At the other end of the armature shaft there is a bevel pinion 49 which meshes with a bevel gear 50 on a vertical shaft 51 mounted in suitable bearings on the frame. This shaft 51 carries near its lower end a spur pinion 52 which meshes with a large spur gear 53 rotatably mounted on the stud shaft 46. Mounted above the gear 53 is a vertically movable collar 54 which carries a plurality of depending clutch pins 55, 55 arranged to extend through suitable apertures in the web of the gear wheel 53. The upper face of the sprocket wheel 45 is provided with a series of bosses 56, there being one boss for each clutch pin, and when the collar 54 and the pins are in their lowermost position the pins engage the bosses to transmit power from the gear wheel to the sprocket wheel. The collar 54 is grooved to receive suitable projections on a lever arm 57 having its end pivotally connected at 58 with the bed frame. A link 59 is connected at its lower end with the lever 57 and at its upper end with an eccentric band 60. By means of the handle 61 the eccentric with which the band 60 engages can be rotated to move the link 59 up or down and to thereby move the collar 54 to bring the pins 55, 55 into or out of engagement with the bosses on the sprocket wheel. It will be seen that by merely moving the lever 61 the operator can connect or disconnect at will the motor and the cutter chain.

At the inner end of the main frame of the machine there is provided a winding drum 62 mounted upon a horizontal longitudinally extending shaft 63. The following gearing is provided for transmitting power from the motor 47 to the drum 62. Mounted upon the shaft 51 is a worm 64 which meshes with a worm wheel 65 on the outer end of a longitudinal shaft 66, this shaft being supported in suitable bearings. Rotatably mounted on the other end of the shaft 66 is a pinion 67 provided with a sleeve-like hub or extension 68 to which is secured a gear wheel 69. The pinion 67 meshes with a gear wheel 67$^a$ on the drum shaft 63. Rotatably mounted on the shaft 66 between the gear wheel 69 and the worm wheel 65 there is a pinion 70. 71 is a rotatable shaft mounted parallel to the shaft 66, this shaft being entirely independent of the shaft 63 upon which the drum 62 is mounted. Secured to the shaft 71 is a gear wheel 72 which meshes with the pinion 70 and a pinion 73 which meshes with the gear wheel 69. The pinion 70 and the gear wheel 69 are each provided with clutch teeth adapted to mesh with similar teeth on a clutch element 74 which is splined on the shaft 66. This clutch element 74 can be moved longitudinally of the shaft 66 by means of a suitably connected hand lever 75. It will be clear that when the clutch element 74 is in its central neutral position, no power will be transmitted through the gearing to drive the drum 62. However, when the clutch element 74 is moved to connect the gear 69 with the shaft, power will be transmitted through the pinion 67 and the gear 67$^a$ to drive the drum at a relatively high speed. When the clutch element 74 is moved to connect the pinion 70 with the shaft, power is transmitted through the gear wheel 72, the shaft 71, the pinion 73, the gear 69, the pinion 67, and the gear 67$^a$ to drive the drum at a much lower speed. Connected with the drum 62 to be wound thereon is a cable 76. The cable passes from the drum under a guide sheave 77 which is mounted in a block 78. This pulley block is in the nature of a caster frame and is mounted to turn in its support on the bed frame. By turning the pulley block the cable can be guided to leave the machine at any angle through a range of approximately 180 degrees. The cable is provided at its outer end with means of attachment to a jack or other stationary object. By connecting the cable to a stationary object and by driving the drum from the motor, either at the higher or at the lower speed, the machine may be moved. However, the manner of handling the machine by itself and in connection with the other parts of the apparatus will be fully described at a later point in this specification and need not be further referred to here.

Preferably the machine is also provided with guide sheaves 80$^a$ and 80$^b$ at the rear corners of the bed frame, and a guide sheave 80$^c$ near the center of the bed frame at the opposite side. This sheave 80$^c$ is mounted in a holder 80$^d$ which is pivoted so that the sheave can be supported either in the position shown in Fig. 4 or can be swung upward out of the way. The reason for providing these guide sheaves will be made apparent hereinafter.

At the outer end of the machine there is provided a drum 81 which, as shown, is mounted for rotation about a horizontal longitudinal axis. A cable 82 is provided to be wound upon and unwound from the drum 81. In order to control and resist the movement of the drum 81 in the cable unwinding direction, there is provided a brake drum which is engaged by a brake band 83. A screw 84 is provided for regulating the tension in the band, this screw being provided with a handle 85. During the cutting operations which are to be described, the cable 82 is secured at its free end to a jack or other stationary object and serves, by means of the brake, to resist and retard the movement of the outer end of the machine.

It will be observed that the cutter frame 42 has all of its parts fixedly connected together so as to constitute one inflexible or rigid whole. The cutting devices, in this case the endless chain 43 with the cutters 44 thereon, are so mounted and guided that they follow a path which is fixed with respect to the frame, viz., across the front end and along the sides thereof. It will also be noted that this rigid cutter frame is movable with respect to the base frame of the truck either transversely or longitudinally.

As has been stated, the mining machine can be supported upon the skids 39, 39 of the cradle 34. The mining machine can be locked in place on the cradle by means of the devices which are indicated at 86 and 87. 86 is a latch mounted on the cradle in a manner to permit transverse sliding movement. It can be controlled by means of a thumb piece 86$^a$. 87 is a plate bolted to the frame of the mining machine. It is provided with a lug 87$^a$ adapted to be engaged by the latch 86. By simply moving the latch the mining machine can be locked in place or released.

88, 88 are two parallel horizontal shafts arranged longitudinally of the cradle at the sides thereof. They are supported in suitable bearings, these bearings preferably being located adjacent the openings 35, 36, 37 and 38 through which pass the vertical studs 29, 30, 31 and 32. The shafts 88, 88 are provided near their ends with pinions 89, 90, 91 and 92, which are positioned to extend into the apertures 35, 36, 37 and 38, and to mesh, respectively, with the rack teeth on the studs 29, 30, 31 and 32 when the studs extend through the apertures. Each shaft 88 carries at the end B, i. e., the end opposite that at which the cutter mechanism of the mining machine projects, a worm wheel 93. These worm wheels 93, 93 are oppositely pitched and mesh with oppositely pitched worms 94, 94 which are rotatable on a transverse shaft 95. This shaft 95 is supported in bearing brackets 96, 96 and 97 which are secured to the cradle 34.

At the end B of the cradle is a controlling mechanism, similar to that covered by my copending application for mining machine trucks, Serial No. 719,898, filed Sept. 12, 1912. This mechanism comprises a transverse shaft 98 mounted in suitable bearings 99, 100 and 101, secured to the lifting base. At one end of the shaft 95 there is secured a sprocket wheel 102 which is in alignment with a similar sprocket wheel 103 on the shaft 98. A chain 104 connects the two sprocket wheels.

Preferably the bearings 99, 100 and 101 are mounted upon or formed as parts of a single casting 105, which also serves to support other parts of the power transmitting mechanism. Mounted in suitable bearings on the casting 105 is a longitudinal shaft 106 provided at its forward end with a clutch element 107, adapted to mesh with the clutch element 48 on the armature shaft of the motor 47 when the mining machine is in place on the lifting base. Secured to the shaft 106 is a worm 108, which meshes with a worm wheel 109, rotatably mounted on the shaft 98. The worm wheel 109 may be operatively connected with the shaft 98 by means of a clutch of the well known friction disc type. This clutch 110 is shown in the drawings and need not be described in detail. The disc 111 is provided for applying pressure to the discs of the clutch and a ball-bearing 112 is provided for carrying the pressure.

Rigidly mounted on the shaft 98, preferably between the bearings 99 and 100 is a brake wheel 113, which is engaged by a friction brake band 114. One end of this brake band is adjustably secured at 115, and the other end of the brake band is pivotally connected at 116 with an arm 117 secured to a short transverse shaft 118, mounted in suitable bearings on the casting 105. The rock shaft 118 also carries an upstanding arm 119, which is adapted to be engaged by a cam 120 on a collar 121, loosely mounted on the shaft 98. The collar 121 can be moved by means of a hand lever 122, and it will be obvious that by moving the hand lever and the collar the cam 120 can engage the arm 119 to move it to tighten the brake band 114. The casting 105 at points adjacent the bearing 100 is provided with a series of inclined teeth 123, and the collar 121 is provided with a series of similarly inclined teeth 124 adapted to mesh with the teeth 123. The collar 121 has formed upon it a flange 125, and between this flange and the plate 111 there is interposed a ball bearing 126. The surfaces of the teeth 123 and 124 are so inclined that when the collar is rotated in a direction to release the brake, the collar is forced longitudinally of the shaft and its motion is transmitted through the ball bearing 126 to the plate 111 to press together the discs of the clutch 110. When the collar is rotated in the other direction the brake is applied and the clutch is released.

Each of the worms 94, 94 is provided at its inner end with clutch teeth which are adapted to mesh with similar teeth on clutch members 127, 127 splined on the shaft 95. Each of these clutch members is provided with a circumferential groove and mechanism is provided for shifting the clutch members simultaneously to bring them into or out of engagement with the teeth on the worms. Referring especially to Fig. 8, 128, 128 are longitudinally arranged levers pivoted at their rear ends to the cradle 34 for lateral swinging and positioned so that their forward ends extend respectively into the grooves in the clutch members 127, 127. Pivoted to the lifting base at 129 is a hand lever 130 which is provided with oppositely disposed arms 131, 131. To each of these arms there is pivotally connected one end of a link 132, the other end of the link being pivotally connected with one of the levers 128 between its ends. When the parts are in the position shown in Figs. 2 and 8, the clutch members will be out of engagement with the clutch teeth on the worms 94, 94 and no power will be transmitted from the motor to the shafts 88, 88. However, by swinging the lever 130 as indicated in Fig. 8, the clutch elements 127, 127 can be moved away from each other and into engagement with the teeth on the worms.

From the foregoing description it will be obvious that when the clutches 127, 127 have been thrown into engagement in the manner described, power can be transmitted from the motor through the several intermediate parts to drive the shafts 88, 88, in opposite directions. These shafts in turn rotate the pinions 89, 90, 91 and 92, which mesh with the rack teeth 33 on the studs 29, 30, 31 and 32. As the shafts 88 are rotated in opposite directions and as the gearing ratio to each shaft is the same as that to the other, the rate of raising or lowering of the cradle on all four studs will be the same. The gearing between the four pinions 89, 90, 91 and 92 is direct and positive and there is no possibility of one pinion getting ahead of the other to cause tilting and consequent binding on the studs. Therefore, by means of the mechanism which I have provided, the mining machine motor can be utilized to adjust the machine for cutting at various heights, the motor while so used preferably being disconnected from the mining machine cutter mechanism and feeding mechanism. By rotating the motor in one direction the cradle and the mining machine can be raised, and by rotating the motor in the other direction, the cradle and the mining machine can be lowered. The worm and wheel connections interposed between the shafts 88, 88 and the other parts of the power transmitting mechanism are non-overhauling and thus serve to automatically lock the lifting base in whatever position it may be when the transmission of power from the motor is interrupted.

I also provide mechanism by means of which the power of the mining machine motor can be used for moving the apparatus as a whole from point to point along the track. Mounted upon the turntable base plate 14 is a transverse rotatable shaft 133 to which is secured a spur gear wheel 134 and a sprocket wheel 135. This sprocket wheel 135 aligns with a similar sprocket wheel 136 on the axle 9. An endless chain 137ª passes over the two sprocket wheels. Preferably the two axles 9 and 10 are connected together for synchronous rotation by means of a chain 137 which passes over suitable sprocket wheels secured to the axles.

138 is a spur gear wheel mounted upon the shaft 95. This gear wheel 138 is positioned to be in longitudinal alignment with the gear wheel 134 when the turntable and the parts carried by it are in normal central position. 139 is a lever which is forked at its lower end to have bearings on the shaft 95 at points on the opposite sides of and closely adjacent to the gear wheel 138. The lever is also provided on opposite sides of the gear wheel with depending arms 140, 140 which carry a transverse pin 141 upon which is mounted an idler pinion 142 which meshes with the gear 138. Connected at its upper end with the upper or outer end of the lever 139 is a slotted link 143. 144 is a suitably mounted bolt which extends through the slot in the link. This bolt is provided with a thumb screw and by means of this thumb screw the link 143 and consequently the lever 139 and the pinion 142 can be locked against movement. Normally the pinion is held in its raised position as shown by full lines in Fig. 5. When it is desired to connect the apparatus for locomotion under its own power the turntable and the parts supported thereby are brought to central position and the cradle is lowered as far as possible. When the parts are thus adjusted the thumb screw on the bolt 144 can be loosened and the pinion 142 can be swung down to mesh not only with the gear 138 but also with the gear 134 on the shaft 133. It is obvious that within certain narrow limits variations in the height of the cradle can be compensated for by a proper adjustment of the idler pinion. After this proper adjustment has been made the pinion can be locked in place by means of the thumb screw. The meshing of the pinion 142 with the gear 134 completes the connection from the mining machine motor to the truck wheels and by rotating the motor in one direction or the other the truck can be driven forward or backward.

It is obvious that it would be undesirable, if not in fact disastrous if an attempt were made to raise or lower the cradle while power was being transmitted to drive the truck along the track; and it is also obvious that it would be undesirable to permit the idler pinion to be in its lowermost position while the cradle is being raised or lowered. In order to avoid either of these contingencies, I have provided an automatic safety locking device. This device comprises a small plate 145 secured to the link 132 which is adjacent the lever 139, and an arcuate lug 146 formed on the lever 139 adjacent the plate. The relative positions of the plate and lug are such that when the lever 139 is in its lowermost position the lug 146 lies in the path of the plate 145. As the plate 145 is secured to one of the levers 132 the levers are locked against movement and it is impossible to throw in the clutches to connect the worms 94, 94, with the shaft 95. Similarly, when the lever 139 is in its upper position and the links 132, 132 have been moved to connect the worms with the shaft, the plate 145 lies in the path of the lug 146 thus preventing the lever 139 from being moved.

Preferably I provide at the rear of the apparatus a rotatable reel upon which can be wound an electric conductor cable for the supplying of current to the mining machine motor. When the apparatus is in use the free end of the cable is connected to a suitable source of electric current supply and the current passes through the cable and from the cable through suitable connections to the motor. In order that the cable may not be fouled when the apparatus is moved, mechanism is provided for automatically winding up the cable on the reel when the apparatus is advanced toward the point of cable attachment, and for permitting it to unwind under frictional resistance when the apparatus is moved in the other direction. In the construction which I have indicated for purposes of illustration there are provided on the cradle two rearward extending reel supporting bars 147, 147, these being preferably angle-shaped in cross-section. The vertical legs of the angles are provided with notches 148, 148 adapted to receive the ends of the reel frame 149 which is in the form of a U. The main body of the frame is horizontal, but the ends are bent downward to engage the notches. Rotatably mounted on the frame for rotation about a horizontal axis is the reel 150. Secured to one side of the reel is a rope sheave 151 and on the shaft 98 there is provided another rope sheave 152 which aligns with the rope sheave 151. An endless rope belt 153 passes over the two sheaves and serves not only to drive the reel when the shaft is rotated, but also to support the reel and the reel frame in the position indicated in the drawings. 154 represents the electric conductor cable which is wound upon the reel. It is provided at its end with a hook 154$^a$. 155 represents the flexible conductor between the cable and the mining machine motor. Preferably this conductor is of such a length as to permit removal of the machine from the truck without breaking the electrical connection. At 156 a suitable support and guide is provided for controlling the cable.

The sheave 152 is loosely mounted on the shaft 96 and is provided at 157 with clutch teeth adapted to mesh with similar teeth on a clutch element 158 which is splined on the shaft. This clutch element 158 can be slid along the shaft into or out of operative position and is frictionally held against accidental movement by the spring clip 159.

It will be noted that the connections between the cutter frame 42 and the main base frame of the truck are such that, while movements of the cutter frame outward and inward and transversely are permitted, the position of the cutter frame is at all times definitely controlled by the position of the truck. For each position of angular adjustment of the cutter frame there is a definite angular relation to the base frame.

In operation, when it is desired to move the apparatus from point to point by its own power, the turntable is placed in its central position and the cradle is lowered so that the pinion 142 can connect the gears 138 and 134 in the manner which has been described. By operating the electric motor in one direction or the other the truck can be moved forward or backward. The motor is controlled by means of the starting box 160. Preferably this starting box is provided with an operating shaft 161 and a hand wheel 162 by means of which the operator can control the motor from the rear end of the machine. The preferable mode of operation is to start the motor with the lever 122 in position to apply the brake 113, 114 and to hold the clutch 110 disengaged. Then by moving the lever the brake can be released and the clutch engaged for the transmission of power. In this way, by means of the lever 122 the operator can easily control the speed of movement of the apparatus and can quickly stop it by means of the brake. It is only necessary to change the motor connections when it is desired to reverse the direction of travel.

Current is supplied to the motor through the flexible cable 155 which has been before referred to. This cable preferably has two separate conductors which are provided with plugs 163 adapted to be inserted in suitable sockets in a box on the motor frame. The other ends of the conductors in the cable 155 are connected as before stated with the cable 154 which is wound upon a reel 150.

If the apparatus is to be moved along a section of track provided with a trolley wire, the cable reel need not be rotated and the clutch element 158 is moved to its inoperative position as shown in Fig. 6. During the movement of the machine along the track, the operator's helper holds the cable hook 154$^a$ against the trolley wire and current is thus supplied to the motor.

When it is desired to enter a side entry or room in which no trolley wire is provided, the end of the cable is connected with a suitable source of electric energy such as the trolley wire in the main entry. The apparatus can then be advanced as before and the cable can be unwound from the reel by its own tension. If desired, however, the clutch element 158 can be moved into operative engagement with the drive sheave 152. The rope belt 153 will then serve to drive the reel to assist its rotation in the cable unwinding direction.

When it is desired to bring the apparatus back out of the side entry or room, the truck is driven as before but the direction is reversed by reversing the direction of rotation of the motor. The clutch element 158 being in operative position, the rope 153 drives the reel in the winding direction and the cable is wound up as the apparatus moves.

One way in which an apparatus embodying my invention can be used is shown in Figs. 11 to 14. As here illustrated the apparatus is used for forming an entry, the machine serving to cut a horizontal kerf at a suitable elevation in the entry face. As has been before stated, this kerf may be made by cutting out a "dirty band" in the coal. As this "dirty band" may be at different heights at different points, it is first necessary to properly adjust the mechanism vertically. This is accomplished as follows: After the machine has reached the place where it is to be used, it is stopped and the pinion 142 is thrown out of mesh with the gear 134. Then the clutches at 127, 127 are thrown into engagement, thus making connections with the shafts 88, 88 and the pinions 89, 90, 91 and 92. By throwing the lever 122, the operator can release the brake 113, 114 and cause the engagement of the clutch 110. Power is then transmitted from the motor through the clutch to drive the pinions 89, 90, 91 and 92 which by their engagement with the racks on the studs 29, 30, 31 and 32, elevate the cradle and the mining machine. When the proper elevation has been reached the operator releases the clutch 110 and the worm and wheel gearing at once automatically locks the parts in adjusted position.

Figure 11:
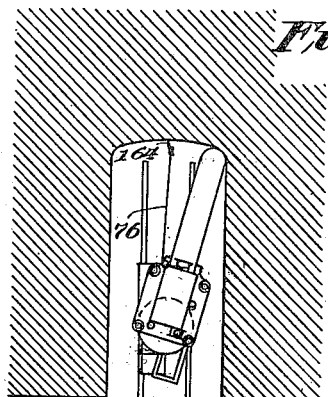

The machine is then swung around toward the right wall as shown in Fig. 11 and is locked in this position by means of the brake shoe 25. A jack is then placed directly in advance of the machine at 164, and the end of the feed cable 76 is carried forward and attached to this jack. The cutters are then set in operation and the drum 62 is rotated by means of the gearing which has been described. The cable 76 draws the whole apparatus bodily forward along the track and forces the cutter mechanism into the face of the entry to the position indicated in Fig. 12. It will be noted that the right edge of the kerf thus formed is smooth and parallel with the center line of the entry.

Figure 12:
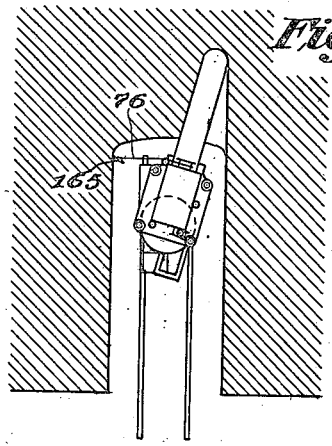

After the position shown in Fig. 12 has been reached the truck wheels are blocked and the turntable is released. The jack is removed and replaced at 165. The cable is again attached to the jack and the drum 62 is again rotated. The cable now serves to swing the mining machine and the movable parts of the supporting apparatus, the result being to cut a kerf across the front of the entry. This transverse cutting is continued until the position shown in Fig. 13 is reached.

Figure 13:
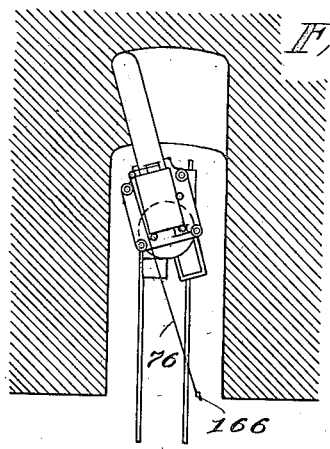
Figs. 11, 12, 13 and 14 are diagrammatic views showing one way in which the apparatus may be used.

After the machine is in the position indicated in Fig. 13 the truck wheels are released and the turntable is locked as before by means of the brake shoe 25. The jack is placed at 166 and the cable is carried backward and attached to it. By rotating the drum 62 the machine is drawn backward along the track to the position shown in Fig. 14, thus completing the kerf and making its left edge smooth and parallel with the center line of the entry. The apparatus can now be withdrawn from the face of the entry and the coal above and below the kerf removed. After this the kerf-cutting operation can be repeated.

Figure 14:
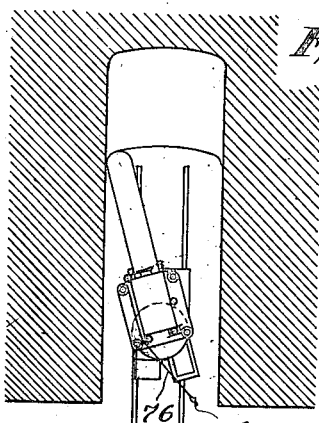

In order that the cable may conveniently be passed backward, as shown in Figs. 13 and 14, I prefer to provide on the cradle 34 a small idler sheave 167 which is in longitudinal alignment with the sheave 77 on the mining machine. It will be seen that by passing the cable backward from the sheave 77 over the sheave 167 it can be used to move the whole apparatus backward without becoming entangled.

In Figs. 15 to 21 I have indicated another way in which the apparatus can be used. These figures show the operations incident to the cutting of a kerf across the face of a relatively wide room as contrasted with the operations just described for cutting a kerf across the face of a relatively narrow entry.

The track upon which the apparatus enters the room is laid close to the right rib as shown in the drawings. The machine is advanced to position and vertically adjusted in the way which has been described in connection with the entry work. Then by setting the jack in front of the machine at 164$^a$, in the way which is shown in Fig. 11, the mechanism can be advanced to a position such as that indicated in Fig. 15 in which the cutter mechanism projects part way into the coal face. When this position is reached the cutting operation is stopped and a skid 168 is brought into use. This skid is clearly shown in Figs. 1, 2 and 10. It is simply a framework having side bars 169 and 170 adapted to align with the parts 39, 39 and 40, 40 of the lifting base. This skid can be removably connected with the cradle by means of hinges at 171, 171, these hinges having removable pivot pins. The skid side bars 169, 170 are preferably angle irons. The angle 169 at the right hand side is furnished with its vertical flange extending upward, whereas the angle 170 at the left hand side is arranged with its vertical flange extending downward. Secured to the angle 170 are pivoted latches 172, 172, which may be swung up above the horizontal flange of the angle as shown by full lines in Figs. 1 and 10, or may be swung downward as indicated by dotted lines in Fig. 1 to leave the space above the level of the horizontal flange of the angle entirely clear. Secured to the depending vertical flange of the angle 170 are sockets 173 which are adapted to receive the ends of track rails for a purpose to be presently set forth. In order to support the skid while the apparatus as a whole is being moved, I provide a link 174 which is pivoted at its lower end to the cross bar 175 of the skid. At the upper end of the link 174 there is rotatably connected a cross-piece 176 provided with a handle 177. When this cross-piece 176 is set transversely, its ends can engage the slots in the side members 42$^a$, 42$^a$ of the cutter frame 42, thus serving to support the skid. By turning the crosspiece 176 it can be released from the slots and can, together with the links 174, be swung downward out of the way.

After the apparatus has been brought into the position shown in Fig. 15, a horse 178 or other suitable support is placed under the skid 168 and the link 174 and the crosspiece 176 are swung downward out of the way. Then by blocking the wheels of the truck the continued winding of the cable 76 will cause the mining machine to be moved with respect to the truck off from the cradle 34 and onto the skid 168. The resulting position of the parts is shown in Fig. 16.

After the position shown in Fig. 16 has been reached the jack is moved and replaced at 179 near the left rib. The end of the feed cable is carried across and secured to the jack. By releasing the turntable of the truck and starting the feed drum the turntable and the mining machine can be swung round to a position in alignment with the track, as shown in Fig. 17. As soon as this position is reached the feeding is stopped and rails 180, 180 are put in place parallel to the coal face. The right hand ends of the rails are supported in the sockets 173, 173 on the skid and the other parts of the rails are supported on suitable horses 181, 181. The cable 82 and the friction controlled drum 81 are now brought into use. The end of the cable 82 is secured to a jack at 182 and the brake band 83 is properly tensioned. The latches 172, 172 are moved to their inoperative positions and the rotation of the feed drum 62 is started. This drum by winding the feed cable 76 causes the machine to be advanced bodily across the room, it sliding off from the skid 168 onto the rails 180, 180. It will be understood that the rails 180, 180 merely serve as supports upon which the mining machine slides and do not serve as guides, the guiding and controlling of the machine being entirely effected by the cables 76 and 82. The cable 82 serves to prevent the too rapid advancement of the rear end of the machine. On account of the great resistance offered to the advancement of the cutter mechanism through the coal and the relatively small frictional resistance offered to the advancement of the bed frame of the machine, additional resistance must be provided for the bed frame. This is supplied by the cable 82 and the brake band 83 which controls the drum 81. By adjusting the brake band the amount of resistance can be varied and the machine can be angled, i. e., the machine bed frame and attached parts can be held back so that the cutter mechanism projects into the coal face at a forward angle, or the bed frame and attached parts can be permitted to get ahead so that the cutter mechanism projects into the coal face at a rearward angle. The machine can be handled upon the rails 180, 180 in the same way that it would be handled upon a mine floor in cutting a kerf at the bottom of the room.

In Fig. 18 there is shown an intermediate position of the machine, and in Fig. 19 the machine is shown in its extreme position with the cutter mechanism projecting into the rib somewhat to maintain the width of the room.

After the cutting operation has been completed the machine can be dragged back along the rails 180, 180 by passing the feed cable 76 back around the guide sheaves 80$^a$, 80$^b$ and 80$^c$, and connecting its end to a jack at 183 near the right rib. This arrangement of the cable is shown in Fig. 20.

After the machine has been hauled onto the skid as shown in Fig. 21, it can be moved backward onto the cradle of the truck by passing the cable backward over the sheave 167 on the cradle and securing its end to some fixed object on the truck frame. After the machine is in place on the cradle, the rails 180, 180 can be removed from the sockets on the skid and the skid can be again fastened by means of the link 174 and the cross-piece 176. The apparatus can then be backed far enough away from the face to clear the cutter mechanism from the kerf and adjusted for movement to another place of use.

It is to be observed that the mining machine truck, together with the supporting frame and the intermediate connections, is adapted to serve as a guide for controlling the operation of the mining machine, even when the machine is not entirely supported on the truck. For instance, as illustrated in Figure 17, the skid 168 serves as a connection between the mining machine and the truck, and this skid serves to guide the machine for movement in an arcuate path fixed relatively to the truck.

I do not broadly claim as a part of my invention a mining machine truck having a turntable upon which a mining machine can be removably supported, nor do I broadly claim a mining machine so mounted on a truck that it can be moved either vertically or angularly.

What I claim is:—

1. In a mining apparatus, the combination of a base frame, supporting wheels therefor, a mining machine supporting frame mounted on the base frame, a mining machine mounted on the supporting frame and comprising a bed frame having relatively smooth supporting shoes, a horizontally projecting cutter frame on the bed frame, a kerf cutting mechanism carried by the cutter frame and comprising devices constantly moving relatively thereto and operable while the machine is on the supporting frame and a motor for driving the cutting mechanism, the said mining machine being readily separable from the supporting frame and operable independently thereof while moving bodily, and means supplemental to the aforesaid supporting wheels for bodily moving the entire apparatus to feed the cutting mechanism of the mining machine to its work.

2. In a mining apparatus, the combination of a main base frame, a mining machine supporting frame mounted on the base frame for rotation about a vertical axis, a mining machine mounted on the supporting frame and comprising a bed frame having relatively smooth supporting shoes, a horizontally projecting cutter frame on the bed frame, a kerf cutting mechanism carried by the cutter frame and comprising devices constantly moving relatively thereto and operable while the machine is on the supporting frame and a motor for driving the cutting mechanism, the said mining machine being readily separable from the base frame and the supporting frame and operable independently thereof while moving bodily, and means for turning the supporting frame with the mining machine thereon about the aforesaid vertical axis to feed the cutting mechanism of the mining machine to its work.

3. In a mining apparatus, the combination of a bodily movable main base frame, a mining machine supporting frame mounted on the base frame for rotation about a vertical axis, a mining machine mounted on the supporting frame and comprising a bed frame having relatively smooth supporting shoes, a horizontally projecting cutter frame on the bed frame, a kerf cutting mechanism carried by the cutter frame and comprising devices constantly moving relatively thereto and operable while the machine is on the supporting frame and a motor for driving the cutting mechanism, the said mining machine being readily separable from the base frame and the supporting frame and operable independently thereof while moving bodily, and means for turning the supporting frame with the mining machine thereon about the aforesaid vertical axis or for bodily moving the base frame with the supporting frame and the mining machine thereon to feed the cutting mechanism of the mining machine to its work.

4. In a mining apparatus, the combination of a main base frame, a mining machine supporting frame mounted on the base frame and vertically adjustable with respect thereto to any one of several positions, a mining machine mounted on the supporting frame and comprising a bed frame having relatively smooth supporting shoes, a horizontally projecting cutter frame on the bed frame, a kerf cutting mechanism carried by the cutter frame and comprising devices constantly moving relatively thereto and operable while the machine is on the supporting frame and a motor for driving the cutting mechanism, the said mining machine being readily separable from the base frame and the supporting frame and operable independently thereof while moving bodily, and means operable with the supporting frame in any vertically adjusted position for bodily moving the entire apparatus to feed the cutting mechanism of the mining machine to its work.

5. In a mining apparatus, the combination of a main base frame, a mining machine supporting frame mounted on the base frame for rotation about a vertical axis and for vertical adjustment with respect thereto to any one of several positions, a mining machine mounted on the supporting frame and comprising a bed frame having relatively smooth supporting shoes, a horizontally projecting cutter frame on the bed frame, a kerf cutting mechanism carried by the cutter frame and comprising devices constantly moving relatively thereto and operable while the machine is on the supporting frame and a motor for driving the cutting mechanism, the said mining machine being readily separable from the base frame and the supporting frame and operable independently thereof while moving bodily, and means operable with the supporting frame in any vertically adjusted position for bodily moving it with the mining machine thereon to feed the cutting mechanism of the mining machine to its work.

6. In a mining apparatus, the combination of a main base frame, supporting wheels therefor, a mining machine supporting frame mounted on the base frame, means for adjusting the supporting frame vertically relatively to the base frame, a mining machine longitudinally slidably mounted on the supporting frame and comprising a bed frame having relatively smooth supporting shoes, a cutter frame projecting from the bed frame in the direction of the sliding movement thereof, a kerf cutting mechanism carried by the cutter frame and comprising devices constantly moving relatively thereto and operable while the mining machine is on the supporting frame or is sliding therealong and a motor for driving the cutting apparatus, the said mining machine being readily separable from the supporting frame and operable independently thereof while moving bodily, and means supplemental to the said wheels for bodily moving the entire apparatus to feed the cutting mechanism of the mining machine to its work.

7. In a mining apparatus, the combination of a main base frame, a mining machine supporting frame mounted on the base frame for rotation about a vertical axis, a mining machine longitudinally slidably mounted on the supporting frame and comprising a bed frame having relatively smooth supporting shoes, a cutter frame projecting from the bed frame in the direction of the sliding movement thereof, a kerf cutting mechanism carried by the cutter frame and comprising devices constantly moving relatively thereto and operable while the mining machine is on the supporting frame or is sliding therealong and a motor for driving the cutting mechanism, the said mining machine being readily separable from the base frame and the supporting frame and operable independently thereof while moving bodily, and means for turning the supporting frame with the mining machine thereon about the aforesaid vertical axis to feed the cutting mechanism of the mining machine to its work.

8. In a mining apparatus, the combination of a wheeled truck, a plurality of upright supports mounted on the truck and arranged to define a horizontal polygon, a cutting mechanism carried by and projecting horizontally from the truck, supporting and adjusting devices for the cutting mechanism engaging all of the upright supports and adapted to operate simultaneously to bodily move the cutting mechanism vertically with respect to the truck, and a motor for actuating the said devices.

9. In a mining apparatus, the combination of a wheeled truck, a plurality of upright supports mounted on the truck and arranged to define a horizontal polygon, a cutting mechanism carried by and projecting horizontally from the truck, supporting and adjusting devices for the cutting mechanism engaging all of the upright supports and adapted to operate simultaneously to bodily move the cutting mechanism vertically with respect to the truck, and a motor for actuating the cutting mechanism and the said devices, said motor being mounted to move bodily with the cutting mechanism.

10. In a mining apparatus, the combination of a wheeled truck, a turn-table on the truck, a cutting mechanism mounted on the turn-table, mechanism for moving the cutting mechanism vertically with respect to the turn-table, and a motor supported by the turn-table for actuating the said moving mechanism.

11. In a mining apparatus, the combination of a wheeled truck, a cutting mechanism mounted on the truck for movement with respect thereto vertically and horizontally, a driving motor connected with the cutting mechanism and bodily movable therewith vertically and horizontally, mechanism for bodily moving the cutting mechanism vertically with respect to the truck, and power connections comprising a manually controllable friction clutch between the motor and the said moving mechanism.

12. In a mining apparatus, the combination of a wheeled truck, a cutting mechanism mounted on the truck, said mechanism being movable in relation to the truck horizontally to cut kerfs in horizontal planes and vertically to vary the elevation at which such kerfs are cut, a motor fixedly connected with the cutting mechanism to move bodily therewith, power connections comprising a manually controllable clutch between the motor and the cutting mechanism, mechanism for bodily moving the cutting mechanism vertically with respect to the truck, and power connections comprising a manually controllable clutch between the motor and the said moving mechanism.

13. In a mining apparatus, the combination of a wheeled truck, a mining machine support mounted on the truck, mechanism for bodily moving the support vertically with respect to the truck, a mining machine removably mounted on the support and having a motor, and separable gearing for connecting the mining machine motor with the said moving mechanism when the mining machine is in place on the support.

14. In a mining apparatus, the combination of a wheeled truck, a turntable mounted on the truck, a mining machine support mounted on the turntable, mechanism for bodily moving the support vertically with respect to the turntable, a mining machine removably mounted on the support and having a motor, and separable gearing for connecting the mining machine motor with the said moving mechanism when the mining machine is in place on the support.

15. In a mining apparatus, the combination of a wheeled truck, a cutting mechanism mounted on the truck for vertical movement with respect thereto, mechanism for bodily moving the cutting mechanism vertically with respect to the truck, a motor supported by the truck, a manually controllable power connection between the motor and the said moving mechanism, and a manually controllable power connection between the motor and the wheels of the truck.

16. In a mining apparatus, the combination of a wheeled truck, a cutting mechanism mounted on the truck for vertical movement with respect thereto, mechanism for bodily moving the cutting mechanism vertically with respect to the truck, a motor mounted to move vertically with the cutting mechanism, a manually controllable friction clutch having its driving element connected with the motor, a manually controllable power connection between the driven element of the clutch and the said moving mechanism, and a manually controllable power connection between the driven element of the clutch and the wheels of the truck.

17. In a mining apparatus, the combination of a wheeled truck, a cutting mechanism mounted on the truck for vertical movement with respect thereto, mechanism for bodily moving the cutting mechanism vertically with respect to the truck, a motor mounted to move vertically with the cutting mechanism, a manually controllable friction clutch having its driving element connected with the motor, a manually controllable brake connected with the driven element of the clutch, a manually controllable power connection between the driven element of the clutch and the said moving mechanism, and a manually controllable power connection between the driven element of the clutch and the wheels of the truck.

18. In a mining apparatus, the combination of a wheeled truck, a cutting mechanism mounted on the truck for vertical movement with respect thereto, mechanism for bodily moving the cutting mechanism vertically with respect to the truck, motive mechanism supported by the truck, a separable power connection between the motive mechanism and the said moving mechanism, a separable power connection between the motive mechanism and the wheels of the truck, and a lock connected with the one of the elements of the first said connection for holding separated the elements of the second said connection when those of the first are engaged.

19. In a mining apparatus, the combination of a wheeled truck, a cutting mechanism mounted on the truck for vertical movement with respect thereto, mechanism for bodily moving the cutting mechanism vertically with respect to the truck, motive mechanism supported by the truck, a separable power connection between the motive mechanism and the said moving mechanism, a separable power connection between the motive mechanism and the wheels of the truck, and a lock connected with the one of the elements of the second said connection for holding separated the elements of the first said connection when those of the second are engaged.

20. In a mining apparatus, the combination of a wheeled truck, a cutting mechanism mounted on the truck for vertical movement with respect thereto, mechanism for bodily moving the cutting mechanism vertically with respect to the truck, motive mechanism supported by the truck, a separable power connection between the motive mechanism and the said moving mechanism, a separable power connection between the motive mechanism and the wheels of the truck, and devices connected with the elements of the said connections for holding separated the elements of the first said connection when those of the second are engaged and for holding separated those of the second said mechanism when those of the first are engaged.

21. In a mining apparatus, the combination of a wheeled truck, a cutting mechanism mounted on the truck, mechanism for bodily moving the mechanism vertically with respect to the truck, a motor connected with the cutting mechanism to drive it, a manually controllable power connection between the motor and the said mechanism for moving the cutting mechanism vertically, and a manually controllable power connection between the motor and the wheels of the truck.

22. In a mining apparatus, the combination of a wheeled truck, a mining machine support mounted on the truck for vertical movement with respect thereto, mechanism for bodily moving the support vertically with respect to the truck, a mining machine removably mounted on the support and having a motor, a clutch element on the mining machine connected with the motor, a clutch element on the support adapted to be engaged by the element on the mining machine, a manually controllable power connection between the clutch element on the support and the mechanism for moving the support vertically, and a manually controllable power connection between the clutch element on the support and the wheels on the truck.

23. In a mining apparatus, the combination of a movable main base frame, a horizontally projecting cutter frame carried by the base frame and movable horizontally with respect thereto angularly about a vertical axis, a connection between the two frames for holding the cutter frame in a definite angular relation to the base frame for each position of angular adjustment, a motor fixedly connected to the cutter frame to move therewith, a kerf cutting mechanism carried by the cutter frame and driven by the motor, the said mechanism comprising devices constantly moving relatively to the cutter frame, and means driven by the said motor for adjusting the cutter frame vertically relatively to the base frame.

24. In a mining apparatus, the combination of a wheeled truck, a horizontally projecting cutting mechanism mounted on the truck for movement about a vertical axis, mechanism for bodily moving the cutting mechanism vertically with respect to the truck, a motor fixedly connected to the cutter mechanism to move therewith, devices for transmitting the power of the motor to move the cutting mechanism about the said vertical axis, a manually controllable power connection between the motor and the mechanism for moving the cutting mechanism vertically, and a manually controllable power connection between the motor and the wheels of the truck.

25. In a mining apparatus, the combination of a wheeled truck, a mining machine support mounted on the truck for movement about a vertical axis, a mining machine removably mounted on the support and having a motor, the said mining machine being operable independently of the support and devices for transmitting the power of the motor to move the support and the mining machine about the said vertical axis.

26. In a mining apparatus, the combination of a wheeled truck, a mining machine support mounted on the truck for movement about a vertical axis, a mining machine removably mounted on the support and having a motor, the said mining machine being operable independently of the support, devices for transmitting the power of the motor to move the support and the mining machine about the vertical axis, and separable gearing for connecting the motor with the wheels of the truck.

27. In a mining apparatus, the combination of a wheeled truck, a mining machine support mounted on the truck for movement about a vertical axis, mechanism for bodily moving the support vertically with respect to the truck, a mining machine removably mounted on the support and having a motor, the said mining machine being operable independently of the support, devices for transmitting the power of the motor to move the support and the mining machine about the said vertical axis, and separable gearing for connecting the motor with the mechanism for moving the cutting mechanism vertically.

28. In a mining apparatus, the combination of a wheeled truck, a mining machine support mounted on the truck for movement about a vertical axis, mechanism for bodily moving the support vertically with respect to the truck, a mining machine removably mounted on the support and having a motor, the said mining machine being operable independently of the support, devices for transmitting the power of the motor to move the support and the mining machine about the said vertical axis, separable gearing for connecting the motor with the wheels of the truck or with the mechanism for moving the cutting mechanism vertically.

29. In a mining apparatus, the combination of a wheeled truck, a mining machine support mounted on the truck for movement about a vertical axis, a mining machine removably mounted on the support and having a motor and a rotatable drum connected with the motor, the said mining machine being operable independently of the support, and a cable connected at one end with the drum to be wound thereon and adapted to be fixed at its other end, whereby the support and the mining machine can be turned as the drum is rotated, or whereby the mining machine can be moved with respect to the support.

30. In a mining apparatus, the combination of a wheeled truck, a cutting mechanism mounted on the truck for bodily movement with respect thereto while cutting and provided with an electric motor, means for moving the cutting mechanism horizontally with respect to the truck to effect the cutting of a kerf, an electric cable reel mounted on the truck for relative movement with the cutting mechanism, and electrical connections between the reel and the motor.

31. In a mining apparatus, the combination of a wheeled truck, a mining machine support mounted on the truck for bodily movement with respect thereto, a mining machine removably mounted on the support and provided with an electric motor, an electric cable reel mounted on the support for relative movement therewith, and a flexible conductor for electrically connecting the reel with the motor either when the mining machine is on the support or separately supported.

32. In a mining apparatus, the combination of a wheeled truck, a mining machine supporting frame mounted on the truck for adjustment with respect thereto about a vertical axis, a mining machine slidably mounted on the supporting frame and provided with a cutting mechanism which projects forward horizontally, the said mining machine being operable independently of the truck, and means for bodily moving the mining machine longitudinally of the supporting frame to cause the cutting mechanism to cut a kerf in a coal face.

33. In a mining apparatus, the combination of a wheeled truck, a mining machine supporting frame mounted on the truck for vertical adjustment with respect thereto, a mining machine slidably mounted on the supporting frame and provided with a cutting mechanism which projects forward horizontally, the said mining machine being operable independently of the truck, and means for bodily moving the mining machine longitudinally of the supporting frame to cause the cutting mechanism to cut a kerf in a coal face.

34. In a mining apparatus, the combination of a wheeled truck, a mining machine supporting frame mounted on the truck for adjustment vertically or for rotation about a vertical axis, a mining machine slidably mounted on the supporting frame and provided with a cutting mechanism which projects forward horizontally, the said mining machine being operable independently of the truck, and means for bodily moving the mining machine longitudinally of the supporting frame to cause the cutting mechanism to cut a kerf in a coal face.

35. In a mining apparatus, the combination of a wheeled truck, a mining machine supporting frame on the truck, a mining machine supporting skid supplemental to the said frame and removably pivoted at one end thereto, the skid being adapted to be independently supported at the other end, a mining machine adapted to normally rest on the supporting frame, and mechanism for feeding the mining machine slowly forward from the frame onto the skid.

36. In a mining apparatus, the combination of a wheeled truck, a mining machine supporting frame on the truck, a mining machine supporting skid supplemental to the said frame and removably pivoted at one end thereto, a mining machine adapted to normally rest upon the supporting frame and having a cutter frame projecting forward over the skid, and means for detachably supporting the skid from the cutter arm.

37. In a mining apparatus, the combination of a wheeled truck, having an elevated mining machine supporting frame, a mining machine supporting element secured supplemental to the said frame and detachably thereto and in register therewith, a mining machine having a bed frame adapted to rest upon the said supporting frame or the said detachable supporting element and a cutter frame rigidly secured to the bed frame and projecting forward therefrom, and means for moving the mining machine laterally from the supporting element in a direction at right angles to that in which the cutter frame extends.

38. In a mining apparatus, the combination of a wheeled truck having an elevated mining machine supporting frame, a mining machine supporting element supplemental to the said frame and detachably secured thereto in register therewith, a mining machine having a bed frame adapted to rest upon the said supporting frame or the said detachable supporting element and a cutter frame rigidly secured to the bed frame and projecting forward therefrom, means for moving the mining machine laterally from the supporting means in a direction at right angles to that in which the cutter frame extends, and movable latches operable for preventing lateral movement of the machine from the supporting means.

39. In a mining apparatus, the combination of a wheeled truck having an elevated mining machine supporting frame, a mining machine supporting element supplemental to the said frame and detachably secured thereto in register therewith, a mining machine having a bed frame adapted to rest on the said supporting frame or the said detachable supporting element, and a cutter frame extending therefrom longitudinally of the said supporting frame and supporting element, and means for moving the mining machine forward longitudinally with respect to the said elements and then laterally with respect to them.

40. In a mining apparatus, the combination of a wheeled truck, mining machine supporting elements secured to and in part mounted on the truck, the said elements being connected with the truck for movement with respect thereto about a vertical axis, a mining machine having a bed frame adapted to rest on the said supporting elements and a cutter frame extending therefrom longitudinally of the said elements, and means for moving the mining machine forward longitudinally with respect to the said elements and then laterally with respect to them.

41. In a mining apparatus, the combination of a wheeled truck, mining machine supporting elements secured to and in part mounted on the truck, a mining machine having a bed frame adapted to rest on the said supporting elements and a cutter frame extending therefrom longitudinally of the said elements, rails extending laterally from the said elements and mounted with their top surfaces at the same level as the bearing surfaces of the supporting elements, and means for moving the mining machine laterally off from the said supporting elements and onto and along the said rails.

42. In a mining apparatus, the combination of a wheeled truck, mining machine supporting elements secured to and in part mounted on the truck, a mining machine having a bed frame adapted to rest on the said supporting elements and a cutter frame extending therefrom longitudinally of the said elements, rails extending laterally from the said elements and mounted with their top surfaces at the same level as the bearing surfaces of the supporting elements, and means for moving the mining machine forward longitudinally with respect to the said supporting elements and then laterally off from them and onto and along the said rails.

43. In a mining apparatus, the combination of a wheeled truck, mining machine supporting elements secured to and in part mounted on the truck, a mining machine having a bed frame adapted to rest on the said supporting elements and a cutter frame extending therefrom longitudinally of the said elements, rails extending laterally from the said elements, and mounted with their top surfaces at the same level as the bearing surfaces of the supporting elements, sockets on one of the supporting elements for receiving and holding the ends of the rails, and means for moving the mining machine laterally off from the said supporting elements and onto and along the said rails.

44. In a mining apparatus, the combination of a mining machine having a horizontally projecting cutter mechanism, a wheeled truck having supporting elements upon which the mining machine can be detachably mounted for guidance during part of a cutting operation, the supporting elements being formed to permit the machine to be moved horizontally off from it, and rails mounted to receive the machine from the supporting elements and guide it during the remainder of the cutting operation.

45. In a mining apparatus, the combination of a movable main base frame, supporting track wheels therefor, a horizontally projecting rigid cutter frame carried by the base frame and movable horizontally with respect thereto bodily outward and inward and also transversely from one to the other of two extreme positions each beyond the vertical plane of the corresponding track wheels, a connection between the two frames for holding the cutter frame in a definite angular relation to the base frame for each position of transverse adjustment, a kerf cutting mechanism carried by the cutter frame and comprising an endless cutter chain running along a path fixed with respect to the cutter frame and extending across the front and along one side thereof, whereby the mechanism is adapted to cut a kerf either when the cutter frame is moving outward or when it is moving transversely, and means operable while the cutting mechanism is in operation for moving the cutter frame outward and for moving it transversely.

46. In a mining apparatus, the combination of a movable main base frame, supporting track wheels therefor, a horizontally projecting rigid cutter frame supported on the base frame and horizontally movable with respect thereto, guiding and controlling connections between the two frames serving to hold the cutter frame in a definite angular relation to the base frame for each position of horizontal adjustment and comprising a horizontal guide and a fixed vertical pivot respectively permitting translative movements outward and inward and angular movements from one to the other of two extreme positions each beyond the vertical plane of the corresponding track wheels, a kerf cutting mechanism carried by the cutter frame and comprising an endless cutter chain running along a path fixed with respect to the cutter frame and extending across the front and along one side thereof, whereby the mechanism is adapted to cut a kerf either when the cutter frame is moving outward or when it is moving angularly, and means operable while the cutting mechanism is in operation for moving the cutter frame outward and for moving it angularly.

47. In a mining apparatus, the combination of a movable main base frame, supporting track wheels therefor, a horizontally projecting rigid cutter frame carried by the base frame and movable horizontally with respect thereto bodily outward and inward and also transversely from one to the other of two extreme positions each beyond the vertical plane of the corresponding track wheels, a connection between the two frames for holding the cutter frame in a definite angular relation to the base frame for each position of transverse adjustment, a kerf cutting mechanism carried by the cutter frame and comprising an endless cutter chain running along a path fixed with respect to the cutter frame and extending across the front and along one side thereof, whereby the mechanism is adapted to cut a kerf either when the cutter frame is moving outward or when it is moving transversely, means for adjusting the cutter frame vertically relatively to the base frame, and means operable while the cutting mechanism is in operation for moving the cutter frame outward and for moving it transversely.

48. In a mining apparatus, the combination of a movable main base frame, supporting track wheels therefor, a horizontally projecting rigid cutter frame carried by the base frame and movable horizontally with respect thereto bodily outward and inward and also transversely from one to the other of two extreme positions each beyond the vertical plane of the corresponding track wheels, a connection between the two frames for holding the cutter frame in a definite angular relation to the base frame for each position of transverse adjustment, a kerf cutting mechanism carried by the cutter frame and comprising an endless cutter chain running along a path fixed with respect to the cutter frame and extending across the front and along one side thereof, whereby the mechanism is adapted to cut a kerf either when the cutter frame is moving outward or when it is moving transversely, means for holding the cutter arm in one of the aforesaid extreme positions, and means supplemental to the track wheels and operable while the cutting mechanism is in operation for moving the cutter frame outward and for moving it transversely and for moving the entire apparatus bodily.

49. In a mining apparatus, the combination of a movable main base frame, supporting track wheels therefor, a horizontally projecting rigid cutter frame carried by the base frame and movable horizontally with respect thereto bodily outward and inward and also transversely from one to the other of two extreme positions each beyond the vertical plane of the corresponding track wheels, a connection between the two frames for holding the cutter frame in a definite angular relation to the base frame for each position of transverse adjustment, a motor fixedly connected to the cutter frame to move therewith, a kerf cutting mechanism carried by the cutter frame and driven by the motor, the said mechanism comprising an endless cutter chain running along a path fixed with respect to the cutter frame and extending across the front and along one side thereof, whereby the mechanism is adapted to cut a kerf either when the cutter frame is moving outward or when it is moving transversely, and means operable while the cutting mechanism is in operation for moving the cutter frame outward and for moving it transversely.

50. In a mining apparatus, the combination of a movable main base frame, supporting track wheels therefor, a horizontally projecting rigid cutter frame supported on the base frame and horizontally movable with respect thereto, guiding and controlling connections between the two frames serving to hold the cutter frame in a definite angular relation to the base frame for each position of horizontal adjustment and comprising a horizontal guide and a fixed vertical pivot respectively permitting translative movements outward and inward and angular movements from one to the other of two extreme positions each beyond the vertical plane of the corresponding track wheels, a motor fixedly connected to the cutter frame to move therewith, a kerf cutting mechanism carried by the cutter frame and driven by the motor, the said mechanism comprising an endless cutter chain running along a path fixed with respect to the cutter frame and extending across the front and along one side thereof, whereby the mechanism is adapted to cut a kerf either when the cutter frame is moving outward or when it is moving angularly, and means operable while the cutting mechanism is in operation for moving the cutter frame outward and for moving it angularly.

51. In a mining apparatus, the combination of a movable main base frame, supporting track wheels therefor, a horizontally projecting rigid cutter frame carried by the base frame and movable horizontally with respect thereto bodily outward and inward and also transversely from one to the other of two extreme positions each beyond the vertical plane of the corresponding track wheels, a connection between the two frames for holding the cutter frame in a definite angular relation to the base frame for each position of transverse adjustment, a motor fixedly connected to the cutter frame to move therewith, a kerf cutting mechanism carried by the cutter frame and driven by the motor, the said mechanism comprising an endless cutter chain running along a path fixed with respect to the cutter frame and extending across the front and along one side thereof, whereby the mechanism is adapted to cut a kerf either when the cutter frame is moving outward or when it is moving transversely, and means driven by the motor and operable while the cutting mechanism is in operation for moving the cutter frame outward and for moving it transversely.

52. In a mining apparatus, the combination of a movable main base frame, supporting track wheels therefor, a horizontally projecting rigid cutter frame carried by the base frame and movable horizontally with respect thereto bodily outward and inward and also transversely from one to the other of two extreme positions each beyond the vertical plane of the corresponding track wheels, a connection between the two frames for holding the cutter frame in a definite angular relation to the base frame for each position of transverse adjustment, a motor fixedly connected to the cutter frame to move therewith, a kerf cutting mechanism carried by the cutter frame and driven by the motor, the said mechanism comprising an endless cutter chain running along a path fixed with respect to the cutter frame and extending across the front and along one side thereof, whereby the mechanism is adapted to cut a kerf either when the cutter frame is moving outward or when it is moving transversely, means for adjusting the cutter frame vertically relatively to the base frame, and means operable while the cutting mechanism is in operation for moving the cutter frame outward and for moving it transversely.

53. In a mining apparatus, the combination of a movable main base frame, supporting track wheels therefor, a horizontally projecting rigid cutter frame carried by the base frame and movable horizontally with respect thereto bodily outward and inward and also transversely from one to the other of two extreme positions each beyond the vertical plane of the corresponding track wheels, a connection between the two frames for holding the cutter frame in a definite angular relation to the base frame for each position of transverse adjustment, a motor fixedly connected to the cutter frame to move therewith, a kerf cutting mechanism carried by the cutter frame and driven by the motor, the said mechanism comprising an endless cutter chain running along a path fixed with respect to the cutter frame and extending across the front and along one side thereof, whereby the mechanism is adapted to cut a kerf either when the cutter frame is moving outward or when it is moving transversely, a power actuated driving mechanism, means driven by the said driving mechanism for adjusting the cutter frame vertically relatively to the base frame, and means operable while the cutting mechanism is in operation for moving the cutter frame outward and for moving it transversely.

54. In a mining apparatus, the combination of a movable main base frame, supporting track wheels therefor, a horizontally projecting rigid cutter frame carried by the base frame and movable horizontally with respect thereto bodily outward and inward and also transversely from one to the other of two extreme positions each beyond the vertical plane of the corresponding track wheels, a connection between the two frames for holding the cutter frame in a definite angular relation to the base frame for each position of transverse adjustment, a motor fixedly connected to the cutter frame to move therewith, a kerf cutting mechanism carried by the cutter frame and driven by the motor, the said mechanism comprising an endless cutter chain running along a path fixed with respect to the cutter frame and extending across the front and along one side thereof, whereby the mechanism is adapted to cut a kerf either when the cutter frame is moving outward or when it is moving transversely, means for holding the cutter arm in one of the aforesaid extreme positions, and means driven by the motor and operable while the cutting mechanism is in operation for moving the cutter frame outward and for moving it transversely and for moving the entire apparatus bodily, the said means being supplemental to the aforesaid track wheels.

55. In a mining apparatus, the combination of a wheeled truck, a mining machine supporting frame mounted on the truck for adjustment with respect thereto about a vertical axis, a mining machine slidably mounted on the supporting frame and provided with a motor and with a kerf cutting mechanism which projects forward horizontally, the said mining machine being operable independently of the truck, means driven by the motor of the mining machine for adjusting the supporting frame vertically relatively to the truck, and means for moving the mining machine horizontally relatively to the truck to cause the cutting mechanism to cut a kerf in a coal face.

56. In a mining apparatus, the combination of a wheeled truck, a mining machine supporting frame mounted on the truck for adjustment with respect thereto angularly about a vertical axis, a mining machine slidably mounted on the supporting frame and provided with a kerf cutting mechanism which projects forward horizontally, the said mining machine being operable independently of the truck, means for locking the supporting frame in angularly adjusted position, and means for bodily moving the mining machine horizontally relatively to the truck or for moving the entire apparatus bodily when the supporting frame is locked, the said means being supplemental to the wheels of the truck.

57. In a mining apparatus, the combination of a movable base frame, four upright supporting devices carried by the base frame and arranged to define a rectangle, a cutter apparatus supported on the said devices below the tops thereof between opposite pairs thereof and movable as a unit vertically with respect to the base frame, the said apparatus comprising a motor and a continuously acting kerf cutting mechanism driven by the motor and extending outward beyond the said supporting devices and the said base frame along horizontal lines, a power actuated driving mechanism, and means engaging each of the said supporting devices and simultaneously driven by the said driving mechanism for moving the cutter apparatus vertically with respect to the base frame.

58. In a mining apparatus, the combination of a movable base frame, a plurality of upright supporting devices carried by the base frame and arranged to define a polygon, a cutter apparatus supported on the said devices and movable as a unit vertically with respect to the base frame, the said apparatus comprising a motor and a continuously acting kerf cutting mechanism driven by the motor and extending outward beyond the said supporting devices and the said base frame along normally horizontal lines and adapted to form a cut when moving laterally or when moving bodily forward, vertical racks on the supporting devices, rotatable pinions engaging the said racks for moving the cutter apparatus vertically with respect to the base frame, a power actuated driving mechanism, and means driven by the said driving mechanism and connected with all of the said pinions to actuate all of them simultaneously.

59. In a mining apparatus, the combination of a movable base frame, a plurality of upright supporting devices carried by the base frame and arranged to define a polygon, a cutter apparatus supported on the said devices and movable as a unit vertically with respect to the base frame, the said apparatus comprising a motor and a continuously acting kerf cutting mechanism driven by the motor and extending outward beyond the said supporting devices and the said base frame along horizontal lines and adapted to form a cut either when moving laterally or when moving bodily forward, vertical racks on the supporting devices, rotatable pinions engaging the said racks for moving the cutter apparatus vertically with respect to the base frame, a power actuated driving mechanism, and a means driven by the said driving mechanism and comprising non-overhauling worm and wheel gearing connected with all of the said pinions to actuate all of them simultaneously.

60. In a mining apparatus, the combination of a movable main base frame, a horizontally projecting rigid cutter frame carried by the base frame and movable horizontally with respect thereto angularly about a vertical axis, a connection between the two frames for holding the cutter frame in a definite angular relation to the base frame for each position of angular adjustment, a kerf cutting mechanism carried by the cutter frame and comprising devices constantly moving along lines fixed with respect thereto, a motor, and means driven by the motor for adjusting the cutter frame vertically relatively to the base frame.

61. In a mining apparatus, the combination of a movable main base frame, supporting track wheels therefor, a horizontally projecting cutter frame carried by the base frame and movable horizontally with respect thereto angularly about a vertical axis, a connection between the two frames for holding the cutter frame in a definite angular relation to the base frame for each position of angular adjustment, a motor fixedly connected to the cutter frame to move therewith, a kerf cutting mechanism carried by the cutter frame and driven by the motor, the said mechanism comprising devices constantly moving relatively to the cutter frame, a power actuated driving mechanism, means driven by the said driving mechanism for adjusting the cutter frame vertically relatively to the base frame, and means driven by the said motor for rotating the track wheels.

62. In a mining apparatus, the combination of a wheeled truck, a turntable on the truck, a horizontally extending cutting mechanism mounted on the turntable, said mechanism comprising an elongated rigid cutter frame and an endless cutter chain mounted thereon and being adapted to cut a horizontally extending kerf when the turntable is turned, a motor fixedly connected with the cutting mechanism to be bodily movable therewith, and mechanism connected to be driven by the motor to bodily move the cutting mechanism vertically with respect to the turntable.

63. In a mining apparatus, the combination of a wheeled truck, a cutting mechanism mounted on the truck for bodily movement with respect thereto while cutting and provided with an electric motor, an electric cable reel carried by the truck, electrical connections between the reel and the motor, and means driven by the motor for rotating the reel.

64. In a mining apparatus, the combination of a wheeled truck, a cutting mechanism mounted on the truck for bodily movement with respect thereto angularly and vertically and provided with an electric motor, an electric cable reel carried by the truck, electrical connections between the reel and the motor, and means driven by the motor for rotating the reel.

65. In a mining apparatus, the combination of a wheeled truck, a cutting mechanism mounted on the truck for bodily movement with respect thereto angularly and vertically and provided with an electric motor, an electric cable reel carried by the truck and mounted to move with the cutting mechanism and motor, and electrical connections between the reel and the motor.

66. In a mining apparatus, the combination of a wheeled truck, a cutting mechanism mounted on the truck for bodily movement with respect thereto and provided with an electric motor, an electric cable reel carried by the truck and mounted to move with the cutting mechanism and motor, electrical connections between the reel and the motor, and means driven by the motor for rotating the reel.

67. In a mining apparatus, the combination of a wheeled truck, a cutting mechanism mounted on the truck for bodily movement with respect thereto while cutting and provided with an electric motor, an electric cable reel carried by the truck, electrical connections between the reel and the motor, means driven by the motor for rotating the reel, and means driven by the motor for rotating the wheels of the truck.

68. In a mining apparatus, the combination of a wheeled truck, a mining machine support mounted on the truck for bodily movement with respect thereto, a mining machine removably mounted on the support and provided with an electric motor, an electric cable reel carried by the truck, and a flexible conductor for electrically connecting the reel with the motor either when the mining machine is on the support or separately supported.

69. In a mining apparatus, the combination of a wheeled truck, a mining machine support mounted on the truck for bodily movement with respect thereto, a mining machine removably mounted on the support and provided with an electric motor, an electric cable reel supported on the truck, a flexible conductor for electrically connecting the reel with the motor either when the mining machine is on the support or separately supported, and means driven by the motor of the mining machine for rotating the reel.

70. In a mining apparatus, the combination of a wheeled truck, a mining machine support mounted on the truck for bodily movement with respect thereto, a mining machine removably mounted on the support and provided with an electric motor, an electric cable reel mounted on the support for movement therewith, a flexible conductor for electrically connecting the reel with the motor either when the mining machine is on the support or separately supported, and means driven by the motor for rotating the reel.

71. In a mining apparatus, the combination of a main base frame, a mining machine supporting frame mounted on the base frame, a mining machine slidably mounted on the supporting frame and comprising a bed frame having relatively smooth supporting shoes, a horizontally projecting cutter frame on the bed frame, a kerf cutting mechanism carried by the cutter frame and having devices constantly moving relatively thereto and operable while the machine is on the supporting frame and a motor for driving the cutting mechanism, the said mining machine being readily separable from the supporting frame and operable independently thereof while moving bodily, and means connected with the base frame and engaging the mining machine when it is separated from the supporting frame to guide it in an arcuate path fixed relatively to the base frame.

72. In a mining apparatus, the combination of a main base frame, a mining machine supporting frame mounted on the base frame for swinging about a fixed vertical axis, a mining machine slidably mounted on the supporting frame and comprising a bed frame having relatively smooth supporting shoes, a horizontally projecting cutter frame on the bed frame, a kerf cutting mechanism carried by the cutter frame and having devices constantly moving relatively thereto and operable while the machine is on the supporting frame and a motor for driving the cutting mechanism, the said mining machine being readily separable from the supporting frame and operable independently thereof while moving bodily, and means connected with the supporting frame and engaging the mining machine when it is separated from the supporting frame to guide it in an arcuate path having the aforesaid vertical axis as a center.

73. In a mining apparatus, the combination of the following elements, to wit, a wheeled truck, a cutting mechanism mounted on the truck and movable from one position of operation to another on the truck, a motor, motor gear, mechanism driven by the motor gear for moving the cutting mechanism as aforesaid relatively to the truck, and mechanism driven by the motor gear to rotate the truck wheels, the motor gear being movable with the cutting mechanism toward and from a position where it automatically engages with the truck wheel driving mechanism.

74. The combination of a wheeled truck, a cutting mechanism on the truck arranged to operate while thereon and being vertically adjustable from one kerf cutting position to another, truck driving devices, devices for vertically adjusting the cutting mechanism, a motor operatively connected to the last said adjusting devices, and means adapted to operatively connect the motor to the truck driving devices when the motor is in a predetermined position.

75. The combination in a mining apparatus, of a wheeled truck, a horizontally projecting cutting mechanism mounted on the truck for vertical movement with respect thereto, a motor fixedly connected with the cutting mechanism to move vertically therewith, and permanently mounted gearing arranged to connect the motor with the truck wheels when the motor is in one position of vertical adjustment with respect to the truck.

76. The combination in a mining apparatus, of a wheeled truck, a horizontally projecting cutting mechanism mounted on the truck for vertical and horizontal movements with respect thereto, a motor fixedly connected with the cutting mechanism to move bodily therewith, and two permanently mounted trains of gearing, one connected with the wheels of the truck and the other connected with the motor to move bodily therewith, the said gear trains being arranged to engage each other when the cutter apparatus and motor are in one position of adjustment with respect to the truck whereby the power of the motor can be transmitted to rotate the wheels.

77. In a mining apparatus, the combination of a wheel supported main base frame, a horizontally projecting cutter frame carried by the base frame and mounted to turn horizontally to different angular positions in relation to the base frame, a connection between the two frames for holding the cutter frame in a definite angular relation to the base frame for each position of angular adjustment, a motor fixedly connected to the cutter frame to move therewith, a kerf cutting mechanism carried by the cutter frame and driven by the motor, the said mechanism comprising devices constantly moving relatively to the cutter frame, and means driven by the said motor for adjusting the cutter frame vertically relatively to the base frame.

78. In a mining apparatus, the combination of a wheel supported main base frame, a horizontally projecting rigid cutter frame carried by the base frame and mounted to turn horizontally to different angular positions in relation to the base frame, a connection between the two frames for holding the cutter frame in a definite angular relation to the base frame for each position of angular adjustment, a kerf cutting mechanism carried by the cutter frame and comprising devices constantly moving along 79. In a mining apparatus, the combination of a base frame, supporting track wheels therefor, a horizontally projecting cutter frame carried by the base frame and mounted to turn horizontally and to move bodily longitudinally in relation to the base frame, a power driven endless cutter chain on the cutter frame, devices for moving the cutter frame as aforesaid, a motor for driving said devices mounted to move bodily with the cutter frame, and a separable train of gearing between the motor and the track wheels adapted to permit the movement of the cutter frame and motor and to transmit the power of the motor to rotate the wheels when the motor is in a predetermined position.

80. In a mining apparatus, the combination of a rigid base frame, supporting track wheels therefor, a movable frame carried by the base frame and mounted to turn in horizontal planes in relation to the base frame, a plurality of relatively widely separated upright supports rigidly secured to the said movable frame, an elongated horizontally projecting cutter frame vertically adjustably mounted on said upright supports, mechanism for effecting vertical adjustment of the cutter frame relative to the upright supports, power driven endless chain cutter devices mounted to move in a horizontal path around the periphery of the cutter frame, a motor carried by the base frame, and means for causing the power of the motor to turn the movable frame and cutter frame in relation to the base frame to cut a horizontally extending kerf.

81. In a mining apparatus, the combination of a rigid base frame, supporting track wheels therefor, a movable frame carried by the base frame and mounted to turn in horizontal planes in relation to the base frame, means for vertically adjustably supporting the cutter frame comprising four upright racks rigidly secured to the movable frame at the angles of a horizontal rectangle and four pinions carried by the cutter frame, each pinion operatively engaging one of the racks, means for rotating the pinions simultaneously to adjust the cutter frame vertically, power driven endless chain cutter devices mounted to move in a horizontal path around the periphery of the cutter frame, a motor carried by the base frame, and means for causing the power of the motor to turn the movable frame and cutter frame relative to the base frame to cut a horizontally extending kerf.

82. In a mining apparatus, the combination of a rigid base frame, supporting track wheels therefor, a movable frame carried by the base frame and mounted to turn in horizontal planes in relation to the base frame, means for vertically adjustably supporting the cutter frame comprising four upright racks rigidly secured to the movable frame at the angles of a horizontal rectangle, two parallel shafts carried by the cutter frame and disposed at the sides of said rectangle so that each extends adjacent two of the upright racks and two pinions fast on each shaft and meshing with the adjacent racks, a transverse shaft geared to the parallel shafts, means for rotating the transverse shaft to adjust the cutter frame vertically, power driven endless chain cutter devices mounted to move in a horizontal path around the periphery of the cutter frame, a motor carried by the base frame, and means for causing the power of the motor to turn the movable frame and cutter frame relative to the base frame to cut a horizontally extending kerf.

83. In a mining apparatus, the combination of a rigid base frame, supporting track wheels therefor, a movable frame carried by the base frame and mounted to turn in horizontal planes in relation to the base frame, means for vertically adjustably supporting the cutter frame comprising four upright racks rigidly secured to the movable frame at the angles of a horizontal rectangle, two parallel shafts carried by the cutter frame and disposed at the sides of said rectangle so that each extends adjacent two of the upright racks and two pinions fast on each shaft and meshing with the adjacent racks, a transverse shaft, worm wheels on the parallel shafts and worms in the transverse shaft meshing with the worm wheels, means for rotating the transverse shaft to adjust the cutter frame vertically, power driven endless chain cutter devices mounted to move in a horizontal path around the periphery of the cutter frame, a motor carried by the base frame, and means for causing the power of the motor to turn the movable frame and cutter frame relative to the base frame to cut a horizontally extending kerf.

84. In a wheel supported coal mining machine adapted to be transported over mine tracks and to cut a horizontal kerf while supported on a track extending longitudinally toward the face of the coal, the combination of a base frame, track wheels supporting said base frame, cutter apparatus supported by and projecting horizontally from said base frame, said cutter apparatus being movable laterally in relation to the base frame while supported thereby to cut a kerf extending transversely across the track on which the machine stands, devices for driving the cutter apparatus, for moving said apparatus laterally in relation to the base frame, and for rotating the track wheels to transport the machine from one working place to another, electric motor devices for actuating the aforesaid devices, means for supplying energizing current to said motor devices comprising a reel connected to and movable with the machine and a flexible conductor connected at one end to the reel and adapted to have its other end connected to a source of current supply, and mechanism for rotating the reel when the machine moves bodily over the mine tracks to wind and unwind the cable.

85. In a coal cutting apparatus, the combination of a base frame, supporting track wheels therefor, an elongated rigid cutter frame projecting horizontally from the base frame, connections between the base frame and the cutter frame supporting the cutter frame for movement bodily forward and backward on the base frame and for swinging laterally from points outside the vertical plane of the track wheels on one rail to points outside the vertical plane of the track wheels on the other rail, the said connections serving to hold the cutter frame in a definite angular relation to the base frame for each position of its lateral movement, a power driven endless cutter chain mounted to travel in a horizontal path around the periphery of the cutter frame, means for locking the cutter frame against lateral movement in a position at an angle to the vertical planes of the track wheels, and power devices, operable while the cutter chain is working, for forcing the cutter frame forward a certain distance on the base frame while so locked, and for turning the cutter frame laterally after it has been advanced on the base frame as aforesaid.

86. In a coal cutting apparatus, the combination of a base frame, supporting track wheels therefor, an elongated rigid cutter frame projecting horizontally from the base frame, connections between the base frame and the cutter frame supporting the cutter frame for adjustment vertically, for movement bodily forward and backward on the base frame and for swinging laterally from points outside the vertical plane of the track wheels on one rail to points outside the vertical plane of the track wheels on the other rail, the said connections serving to hold the cutter frame in a definite angular relation to the base frame for each position of its lateral movement, a power driven endless cutter chain mounted to travel in a horizontal path around the periphery of the cutter frame, means for locking the cutter frame against lateral movement in a position at an angle to the vertical planes of the track wheels, mechanism for adjusting the cutter frame vertically in parallelism and power devices, operable while the cutter chain is working, for forcing the cutter frame forward a certain distance on the base frame while so locked, and for turning the cutter frame laterally after it has been advanced on the base frame as aforesaid.

87. In a coal cutting apparatus, the combination of a base frame, supporting track wheels therefor, an elongated rigid cutter frame projecting horizontally from the base frame, connections between the base frame and the cutter frame supporting the cutter frame for movement bodily forward and backward on the base frame and for swinging laterally from points outside the vertical plane of the track wheels on one rail to points outside the vertical plane of the track wheels on the other rail, the said connections serving to hold the cutter frame in a definite angular relation to the base frame for each position of its lateral movement, a power driven endless cutter chain mounted to travel in a horizontal path around the periphery of the cutter frame, means for locking the cutter frame against lateral movement in a position at an angle to the vertical planes of the track wheels, and power devices, operable while the cutter chain is working, for advancing the apparatus bodily toward the coal for a certain distance, for thereafter moving the cutter frame bodily on the base frame and for swinging the cutter frame laterally.

88. In a coal cutting apparatus, the combination of a base frame supporting track wheels therefor, an elongated rigid cutter frame projecting horizontally from the base frame, connections between the base frame and the cutter frame supporting the cutter frame for adjustment vertically, for movement bodily forward and backward on the base frame and for swinging laterally from points outside the vertical plane of the track wheels on one rail to points outside the vertical plane of the track wheels on the other rail, the said connections serving to hold the cutter frame in a definite angular relation to the base frame for each position of its lateral movement, a power driven endless cutter chain mounted to travel in a horizontal path around the periphery of the cutter frame, means for locking the cutter frame against lateral movement in a position at an angle to the vertical planes of the track wheels, mechanism for adjusting the cutter frame vertically in parallelism, and power devices, operable while the cutter chain is working, for advancing the apparatus bodily toward the coal for a certain distance, for thereafter moving the cutter frame bodily on the base frame and for swinging the cutter frame laterally.

89. In a mining apparatus, the combination of a rigid base frame, supporting track wheels therefor, a movable frame carried by the base frame and mounted to turn in horizontal planes in relation to the base frame, two pairs of upright supports rigidly secured to the said movable frame at the angles of a horizontal polygon, a cutting mechanism arranged between and vertically adjustably mounted on the two pairs of upright supports, the said mechanism comprising an elongated horizontally projecting cutter frame and power driven endless chain cutter devices mounted to move in a horizontal path around the periphery of the cutter frame, mechanism for effecting vertical adjustment of the cutter frame relative to the upright supports, a motor carried by the base frame, and means for causing the power of the motor to turn the movable frame and cutter frame in relation to the base frame to cut a horizontally extending kerf.

90. In a mining apparatus, the combination of a rigid base frame, supporting track wheels therefor, a movable frame carried by the base frame and mounted to turn in horizontal planes in relation to the base frame, a plurality of upright supports rigidly secured to the said movable frame at the angles of a horizontal polygon, two of said supports being disposed at relatively widely separated points at the front end of the movable frame, an elongated horizontally projecting cutter frame vertically adjustably mounted on said upright supports and disposed between the two front supports, mechanism for effecting vertical adjustment of the cutter frame relative to the upright supports, power driven endless chain cutter devices mounted to move in a horizontal path around the periphery of the cutter frame, a motor carried by the base frame, and means for causing the power of the motor to turn the movable frame and cutter frame in relation to the base frame to cut a horizontally extending kerf.

91. The combination of a wheeled truck, a frame thereon for supporting a mining machine which has a cutting apparatus projecting beyond said frame and a supplemental machine-supporting skid detachably connected to the end of said frame and projecting laterally therefrom and, when attached, positioned below said cutting apparatus, said skid being adapted to be detached to permit the cutting apparatus to operate while the mining machine is on said frame or, at option, to be correlated in position with stationary skids supported independently of the frame, substantially as set forth, to permit the mining machine to be transferred over said detachable skid to the stationary skids.

92. The combination of a wheeled truck, a rotary and vertically adjustable frame thereon adapted to support a mining machine which has a cutting apparatus projecting beyond said frame, a skid detachably connected to said frame at one end and extending outwardly therefrom and positioned below said cutting apparatus, a rotary series of vertical studs arranged at the angles of a horizontal polygon and holding the said machine-supporting frame, power mechanism for rotating the frame and studs while supporting the said mining machine and cutting apparatus and to bring the skid to predetermined position and the power mechanism also being adapted to move the frame vertically on the studs in horizontal parallelism to adjust the cutting apparatus from one horizontal plane to another.

93. The combination of a wheeled truck, a mining machine supporting frame provided with skids for supporting a mining machine and guiding it for relative bodily movement longitudinally, means for supporting the said frame on the truck and permitting vertical adjustment with respect thereto, mechanism for bodily moving the supporting frame vertically with respect to the truck, a power receiving element on the supporting frame adjacent the skids, and power connections comprising a manually controllable friction clutch between the said element and the said moving mechanism.

94. The combination of a wheeled truck, a mining machine supporting frame provided with skids for supporting a mining machine and guiding it for relative bodily movement longitudinally, means for supporting the said frame on the truck and permitting vertical adjustment with respect thereto, a power receiving element adjacent the said skids, and mechanism connected to be driven by the said element to rotate the truck wheels.

95. The combination of a wheeled truck, a mining machine supporting frame provided with skids for supporting a mining machine and guiding it for relative bodily movement longitudinally, means for supporting the said frame on the truck and permitting vertical adjustment with respect thereto, a power receiving element adjacent the said skids, mechanism connected to be driven by the said element to bodily move the said supporting frame vertically with respect to the truck, and mechanism connected to be driven by the said element to rotate the truck wheels.

96. The combination of a wheeled truck, a mining machine supporting frame provided with skids for supporting a mining machine and guiding it for relative bodily movement longitudinally, means for supporting the said frame on the truck, the said means permitting adjustment of the frame vertically or angularly about a vertical axis, a power receiving element adjacent the said skids, and mechanism connected to be driven by the said element to rotate the truck wheels.

97. The combination of a wheeled truck, a mining machine supporting frame provided with skids for supporting a mining machine and guiding it for relative bodily movement longitudinally, means for supporting the said frame on the truck, the said means permitting adjustment of the frame vertically or angularly about a vertical axis, a power receiving element adjacent the said skids, mechanism connected to be driven by the said element to bodily move the said supporting frame vertically with respect to the truck, and mechanism connected to be driven by the said element to rotate the truck wheels.

98. The combination of a wheeled truck, a mining machine supporting frame provided with skids for supporting a mining machine and guiding it for relative bodily movement longitudinally, means for supporting the said frame on the truck and permitting vertical adjustment with respect thereto, mechanism for bodily moving the supporting frame vertically with respect to the truck, a power receiving element on the supporting frame adjacent the skids, manually controllable power connections between the said element and the said moving mechanism, and manually controllable power connections between the said element and the truck wheels.

99. The combination of a wheeled truck, a mining machine supporting frame rigidly supported on the truck and extending from one end of the truck to the other, a mining machine supporting skid supplemental to the said frame, the inner end of the said supplemental skid being detachably pivoted to one end of the supporting frame and the outer end of the supplemental skid being adapted to be independently supported, and devices at one side of the supplemental skid for normally holding a mining machine thereon against relative lateral movement, the said devices being movable to release the mining machine and permit it to move laterally off from the skid.

100. The combination of a wheeled truck, a mining machine support mounted on the truck for bodily movement with respect thereto, an electric cable reel mounted on the support for movement therewith, and a flexible conductor adapted for electrically connecting the reel with the motor of a mining machine either when the machine is on the support or is separately supported.

101. The combination of a wheeled truck, a mining machine support mounted on the truck for bodily movement vertically with respect thereto, an electric cable reel mounted on the support for movement therewith, and a flexible conductor adapted for electrically connecting the reel with the motor of a mining machine either when the machine is on the support or is separately supported.

102. The combination of a wheeled truck, a mining machine support mounted on the truck for bodily movement with respect thereto, an electric cable reel mounted on the support for movement therewith, a flexible conductor adapted for electrically connecting the reel with the motor of a mining machine either when the machine is on the support or is separately supported, a power receiving element mounted on the support adjacent the skids, and means for transmitting power from the said element to rotate the reel.

103. Coal cutting apparatus comprising, in combination, a base, a rotatably movable support mounted on said base, a complete coal cutter comprising a shoe on which said cutter is adapted to slide while cutting independently of said base, a cutter chain, feeding mechanism, and an actuator for said cutter chain and said feeding mechanism, said coal cutter being separably mounted on said support and detachable therefrom for operation independent of said base.

104. Coal cutting apparatus comprising, in combination, a base, a rotatably movable support mounted on said base, a complete coal cutter comprising a shoe on which said cutter is adapted to slide while cutting independently of said base, a cutter chain, flexible tension feeding mechanism, and an actuator for said feeding mechanism, said coal cutter being separably mounted on said support and detachable therefrom for operation independent of said base.

105. In a mining machine truck, truck wheels, a fixed lower frame carried thereon, truck driving mechanism at one end of said frame connected to said wheels, a machine guiding frame swiveled on said lower frame, a mining machine movable longitudinally of said swiveled frame, and devices comprising truck driving means on said mining machine for actuating the aforesaid truck driving mechanism.

106. In a mining machine truck, truck wheels, a lower frame carried thereon, a machine guiding frame swiveled on said lower frame, a mining machine supported by said wheels and movable longitudinally of said guiding frame, means for driving said wheels from said machine, and means for moving said machine longitudinally of said guiding frame.

107. The combination with a mining machine of the continuous cutting type and having means on which the machine is adapted to be propelled along the mine bottom, of a mining machine truck and means on said truck whereby the machine may move during the starting cut directly from the truck in a direction transverse to the longitudinal axis of said truck.

108. The combination with a mining machine of the continuous cutting type and having means on which the machine is adapted to be propelled along the mine bottom, of a mining machine truck carrying a pivoted starting frame providing means for guiding said machine on a starting cut transverse to the longitudinal axis of said truck.

109. The combination with a mining machine of the continuous cutting type and having means on which the machine is adapted to be propelled along the mine bottom, of a pivoted starting frame providing means for guiding said machine on a starting cut transverse to the longitudinal axis of said truck.

In testimony whereof I affix my signature, in presence of two witnesses.

EDWARD L. HOPKINS.

Witnesses:
G. W. KALTENBACH,
DUDLEY T. FISHER.